(12) United States Patent
Sellick et al.

(10) Patent No.: US 6,595,234 B2
(45) Date of Patent: Jul. 22, 2003

(54) AUTO-DRAIN UNIT

(75) Inventors: David Sellick, Bisley (GB); Alan Troup, West Sussex (GB)

(73) Assignee: Parker-Hannifin plc, Herts (GB)

( * ) Notice: Subject to any disclaimer, the term of this patent is extended or adjusted under 35 U.S.C. 154(b) by 0 days.

(21) Appl. No.: 10/208,383

(22) Filed: Jul. 29, 2002

(65) Prior Publication Data
US 2003/0010380 A1 Jan. 16, 2003

Related U.S. Application Data

(63) Continuation of application No. PCT/GB01/00521, filed on Feb. 9, 2001.

(30) Foreign Application Priority Data

Feb. 9, 2000 (GB) .............................................. 0002790

(51) Int. Cl.[7] .............................................. F16K 31/12
(52) U.S. Cl. ...................................................... 137/188
(58) Field of Search ......................................... 137/188

(56) References Cited

FOREIGN PATENT DOCUMENTS

| DE | 236606 | 7/1911 |
|---|---|---|
| FR | 1506346 | 12/1967 |
| WO | WO 01/59355 | 8/2001 |

OTHER PUBLICATIONS

Notification of Transmittal of International Search Report, together with International Preliminary Examination Report in corresponding PCT Application No. PCT/GB01/00521.

Primary Examiner—Gerald A. Michalsky
(74) Attorney, Agent, or Firm—Christopher H. Hunter

(57) ABSTRACT

An auto-drain unit for a compressed gas supply system, comprising: a first, main chamber including a liquid collection reservoir; a second, reference chamber; a discharge valve actuatable to discharge collected liquid from the liquid collection reservoir; a trigger mechanism for actuating the discharge valve; a diaphragm at least in part defining the liquid collection reservoir and the reference chamber, the diaphragm being configured to be movable under the weight of liquid collected in the liquid collection reservoir and operate the trigger mechanism when the weight of collected liquid exceeds a predetermined threshold; and a fluid conduit fluidly connecting the reference chamber to a location in the main chamber above the maximum possible liquid level therein.

20 Claims, 22 Drawing Sheets

AUTO-DRAIN UNIT

CROSS REFERENCE TO RELATED APPLICATION

This application is a continuation of copending International Application No. PCT/GB01/00521, filed Feb. 9, 2001, which designated the United States, and claims priority to Great Britain Patent Application 0002790.4, filed Feb. 9, 2000, the disclosures of which are incorporated herein by reference.

BACKGROUND OF THE INVENTION

The present invention relates to an auto-drain unit for compressed gas supply systems, in particular pneumatic supply systems.

In pneumatic supply systems, for example, the compressed air generated by the system generator includes, inter alia, entrained water. This water has to be removed before reaching the points of use.

It is common to use filter assemblies to extract the water from compressed air delivered through pneumatic supply systems, with the filter assemblies typically being mounted in modules which often include additional devices, such as pressure regulators and oil-mist lubricators. These filter assemblies include a hydrophobic filter element on which water agglomerates and a bowl in which the water is collected. In some designs, the filter assemblies are configured to cause the compressed air stream to form a vortex in the filter bowl, which vortex creates a centrifuging action and separates water from the compressed air stream.

In such filter assemblies, an auto-drain unit is provided for automatically discharging collected water from the filter bowl before the water level can cause flooding of the filter element. Several auto-drain units are available which provide for the automatic discharging of collected water when the water level reaches a predetermined level, as disclosed for example in U.S. Pat. Nos. 5,636,655 and 5,595,210.

The existing auto-drain units typically incorporate a main discharge valve which is actuatable to discharge collected water from the filter bowl, a trigger valve for actuating the discharge valve, and a light polymer float for actuating the trigger valve. The float is configured to be freely movable vertically in the filter bowl such that, as the water level rises in the filter bowl, the flotation force acting on the float causes the float to rise until such point that the trigger valve is actuated when the collected water reaches a predetermined depth. When the trigger valve is actuated, the system pressure acts on the discharge valve to actuate the same and cause the collected water together with some compressed air to be discharged from the filter bowl.

The use of a float to actuate the trigger valve has, however, a number of drawbacks, as the flotation force, which is the weight of water displaced by the float less the weight of the float itself, is determined by the size of the float, which governs the water displacement, and the weight of the float. The physical size of the float is constrained as the float must be able to fit into the smallest filter bowls commercially available in order to allow for general application. Also, since the float has some non-negligible weight, even when formed of a light polymeric material, the force achievable from a given volume of water is reduced by that weight. Thus, the floatation force which can be developed, given the possible float materials and size, is relatively small, typically less than 10 g. In existing designs, this small force has to be mechanically amplified by the use of a lever arrangement to ensure reliable operation of the trigger valve.

In addition, these existing auto-drain units are also prone to damage because of the delicate lever arrangement and the light float, not least when exposed to the slug of water swept into the filter bowl during system start-up.

Furthermore, the construction of the float is constrained by the fact that the system pressure can continually vary over a wide range of pressures, and particularly at system shutdown. For example, a system working nominally at 10 barg can fall to 0 barg when shut down. If the float is hollow, the float will experience large differential pressure forces across the walls of the float. These pressures would cause the float to split and render the auto-drain unit useless, and thus the float has to be specially configured, which introduces additional complexity and cost. This is a common design weakness in commercial auto-drain units. Other float constructions are used, for example, floats made from a closed-cell polymer foam, which are sufficiently strong to withstand the changing pressure forces without damage and do not take up water or oil. However, this material is expensive.

Another problem with the existing auto-drain units arises from the fact that the water collected from pneumatic supply systems is rarely clean. Collected water usually contains oil and particles of dirt and/or rust, and can also contain algae and other organic growths. When exposed to such contaminants, small orifices can become blocked, sliding parts can suffer from stiction problems and the component materials can be chemically degraded.

A further drawback of the existing auto-drain units is that the height of the column of water required to actuate the trigger valve is variable and dependent on the system pressure. In the existing auto-drain units, for a circular trigger valve orifice, the closing force F is given by $F=8PD^2$, where P is the pressure differential across the trigger valve and D is the orifice diameter. Thus, the closing force F acting on a trigger valve orifice of diameter 0.5 mm at a pressure differential of 12 bar is 24 gf. In this case, a 4:1 or 5:1 mechanical advantage would be required to ensure that the float would operate the trigger valve reliably over the possible system pressure range. This dependence can be reduced by providing the trigger valve orifice as a very small orifice, for example, less than 0.5 mm, thereby reducing the relative effect of the pressure differential. This, however, creates manufacturing and design problems, as such small orifices having a defined gas conductance are very difficult to manufacture. There are also reliability issues as small orifices are more easily blocked with oil or debris. Also, the surface tension of the water is a significant factor where small orifices are utilized.

It is an aim of the present invention to provide an improved auto-drain unit for use in compressed gas supply systems, in particular pneumatic supply systems. In a preferred aspect, it is an aim of the present invention to provide an auto-drain unit which is pressure balanced and is triggered by the same volume of collected liquid irrespective of the system pressure.

Accordingly, the present invention provides an auto-drain unit for a compressed gas supply system, comprising: a first, main chamber including a liquid collection reservoir; a second, reference chamber; a discharge valve actuatable to discharge collected liquid from the liquid collection reservoir; a trigger mechanism for actuating the discharge valve; a diaphragm at least in part defining the liquid collection reservoir and the reference chamber, the diaphragm being configured to be movable under the weight of liquid collected in the liquid collection reservoir and operate the trigger mechanism when the weight of collected liquid exceeds a predetermined threshold; and a fluid conduit fluidly connecting the reference chamber to a location in the main chamber above the maximum possible liquid level therein.

Preferably, the diaphragm is slack and able to move freely when loaded.

More preferably, the diaphragm is shaped such the chord length is greater than the lateral dimension.

Preferably, the diaphragm has a thickness of not more than about 50 μm.

More preferably, the diaphragm has a thickness of not more than about 30 μm.

Preferably, the trigger mechanism comprises a trigger valve for actuating the discharge valve, the trigger valve being actuated when the weight of collected liquid exceeds a predeterminable threshold.

More preferably, the trigger valve includes a paddle unit which includes a paddle member disposed adjacent the diaphragm such as to be acted upon by the diaphragm when liquid collects in the liquid collection reservoir, the paddle unit being movable between a first, non-actuated position and a second, actuated position.

Preferably, the surface of the paddle member adjacent the diaphragm is a convex surface.

More preferably, the surface of the paddle member adjacent the diaphragm is a part spherical surface.

Preferably, the trigger valve includes a biasing element for biasing the paddle unit to the first position.

In one embodiment the paddle unit is pivotally supported such as to be pivoted when the weight of liquid acting on the paddle member exceeds a predetermined threshold.

In one preferred embodiment the paddle unit supports a valve pad for opening or closing a valve seat.

In another preferred embodiment the trigger valve further includes a sealing valve unit coupled to the paddle unit, the sealing valve unit including a piston and a valve pad mounted thereto for opening or closing a valve seat.

In another embodiment the paddle unit is axially movable such as to be moved axially when the weight of liquid acting on the paddle member exceeds a predetermined threshold.

In a preferred embodiment the paddle unit includes a bobbin which is slideably disposed in a valve sleeve, the bobbin being movable in the valve sleeve between actuated and non-actuated positions.

Preferably, the trigger valve is pressure balanced.

Preferably, the fluid conduit comprises an annular conduit.

More preferably, the auto-drain unit further comprises an annular element defining a cavity and including the fluid conduit at the periphery thereof.

Preferably, the annular element comprises first and second co-axial tubular sections of different lateral dimension, with the fluid conduit being defined therebetween.

Preferably, the diaphragm extends laterally across the cavity.

Preferably, the compressed gas supply system is a pneumatic supply system.

The present invention also extends to a filter assembly incorporating the above-described auto-drain unit.

With this arrangement, the present invention advantageously provides an auto-drain unit which is triggered by the weight of a collected column of liquid, and does not incorporate a float or require the trigger valve to be submerged in the collected liquid. In a preferred embodiment the trigger valve is pressure balanced such that the weight of liquid required to actuate the auto-drain unit does not vary in dependence on the system pressure, thereby enabling the use of valve orifice sizes of greater dimension.

Preferred embodiments of the present invention will now be described hereinbelow by way of example only with reference to the accompanying drawings, in which:

DETAILED DESCRIPTION OF A PREFERRED EMBODIMENT

Figure 1:
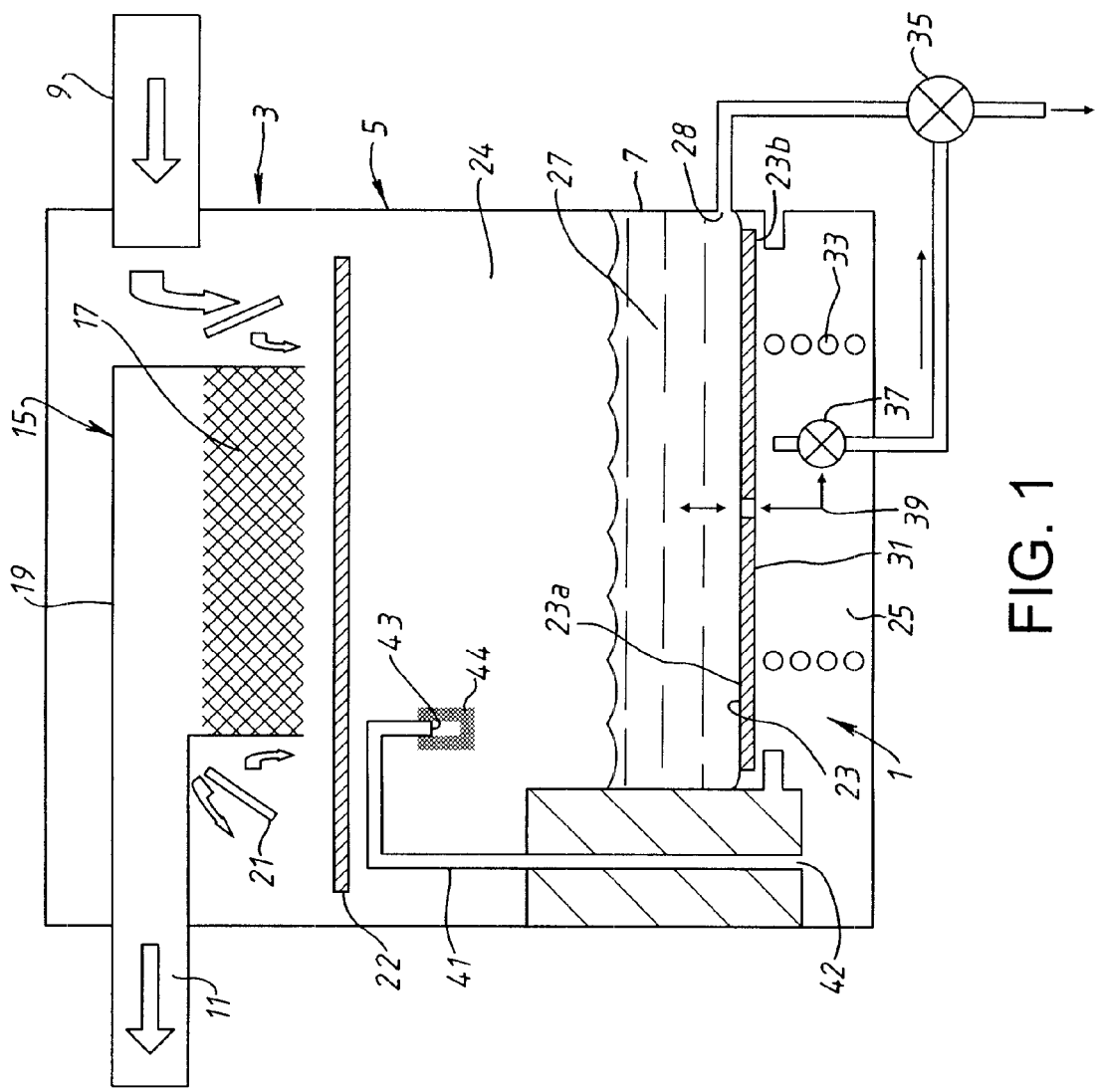
FIG. 1 schematically illustrates an auto-drain unit in accordance with the present invention.
Figure 2:
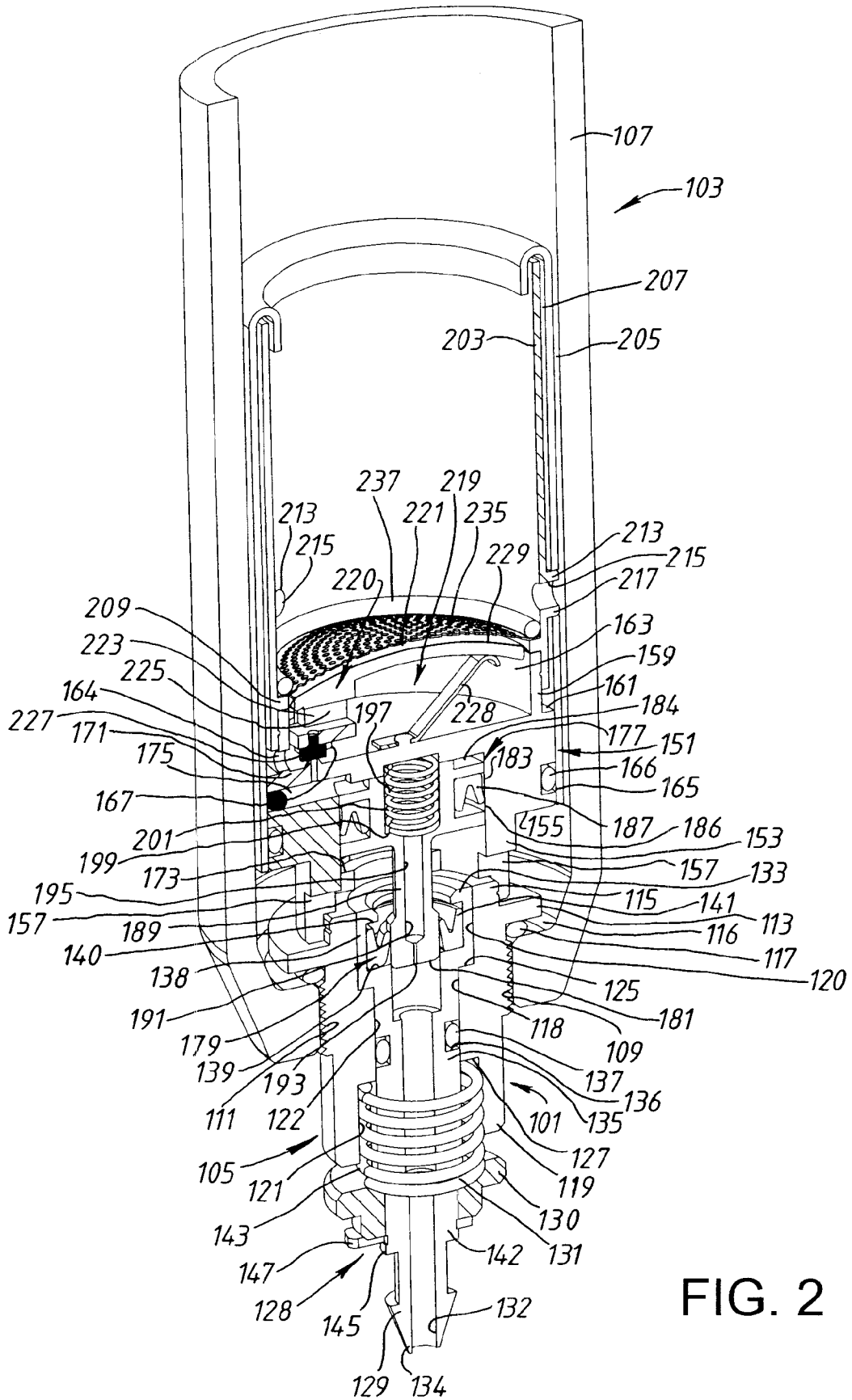
FIG. 2 illustrates a part cut-away perspective view of an auto-drain unit in accordance with a first embodiment of the present invention.
Figure 3:
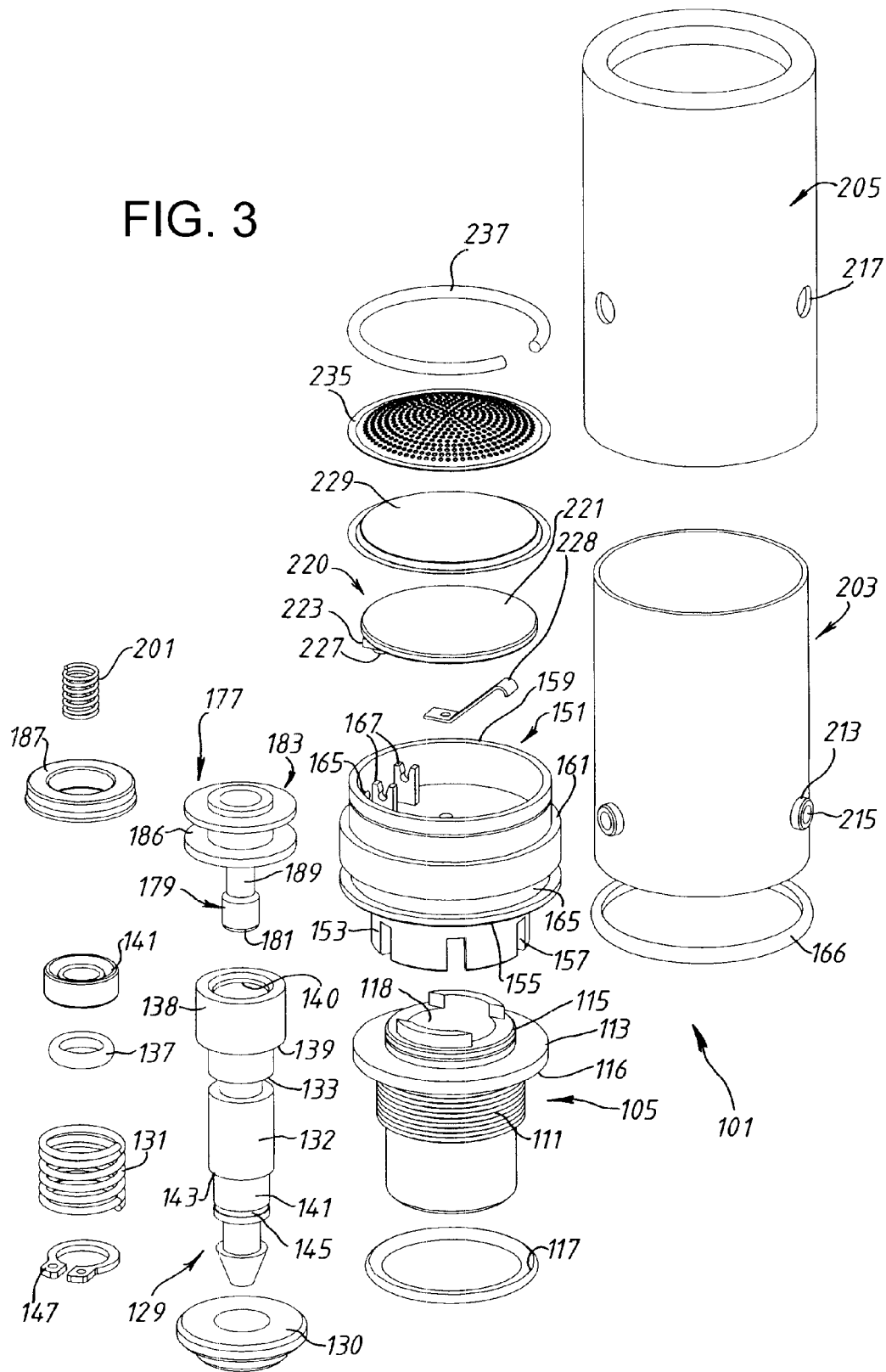
FIG. 3 illustrates an exploded perspective view of the auto-drain unit of FIG. 1.

FIG. 1 schematically illustrates an auto-drain unit 1 in accordance with the present invention as incorporated in a filter assembly 3.

The filter assembly 3 comprises a housing 5, the lower region of which defines a bowl 7, in this embodiment a transparent bowl, in which the auto-drain unit 1 is fitted. The housing 5 includes a gas inlet 9 which is connected to a compressed gas supply, in this embodiment a compressed air supply, and a gas outlet 11 which is connected to downstream components.

The filter assembly 3 further comprises a filter unit 15 which is connected to the gas outlet 11. The filter unit 15 comprises a filter 17, in this embodiment is a disk-shaped filter disposed centrally in an upper region of the housing 5, and a fluid conduit 19 which fluidly connects the filter 17 to the gas outlet 11.

The filter assembly 3 further comprises a plurality of cyclone blades 21 disposed about the filter 17 for deflecting the incoming gas stream outwardly and downwardly and creating a vortex at the periphery of the housing 5 for separating entrained liquid, in this embodiment water, from the compressed gas.

The filter assembly 3 further comprises a diffuser shield 22 which is disposed beneath the filter 17. The diffuser shield 22 extends laterally beyond the filter 17 and is spaced therefrom such as to prevent the direct flow of the incoming compressed gas to the filter 17.

The auto-drain unit 1 comprises a thin diaphragm 23 which is disposed in the housing 5 such as to separate the same into two chambers 24, 25, an upper, main chamber 24 and a lower, reference chamber 25. The upper surface 23a of the diaphragm 23 defines at least in part the lower surface of a liquid collection reservoir 27 for collecting liquid separated from the incoming compressed gas stream. The collection reservoir 27 includes an outlet port 28 for enabling the collection reservoir 27 to be drained of collected liquid. With this configuration, the weight of liquid collected in the collection reservoir 27 bears down on the diaphragm 23. The lower surface 23b of the diaphragm 23 defines in part the surface of the reference chamber 25.

The auto-drain unit 1 further comprises a paddle member 31 which is disposed to the lower surface 23b of the diaphragm 23, and a biasing element 33, in this embodiment a light compression spring, which acts on the paddle member 31 to support the paddle member 31 and the diaphragm 23 thereabove. In this configuration, the biasing element 33 is compressed as liquid is collected in the collection reservoir 27.

The function of the diaphragm 23 is to contain the collected volume of liquid, thereby preventing the same from entering the reference chamber 25, and to transfer the force of the collected liquid column to the paddle member 31. In practice, the smallest filter bowl 7 into which the auto-drain unit 1 is likely to be fitted would have an internal diameter of about 25 mm. This diameter allows for the diaphragm 23 to have a usable diameter of approximately 20 mm. Where the filter bowl 7 could accommodate a depth of liquid of about 25 mm in the collection chamber 27, the weight of liquid available to actuate the auto-drain unit 1 could be as little as about 8 g. In order for the diaphragm 23 to be displaced sufficiently to achieve actuation, typically from about 1 to about 2 mm, the diaphragm 23 has to be extremely light and flexible. In this embodiment the diaphragm 23 is a thin film which is oversized relative to the aperture in which the same is located and thereby allows for substantially free vertical movement. One suitable material for the diaphragm 23 is polyvinylidene chloride (PVDC). The diaphragm 23 can be formed with a specific profile, for example a part-spherical profile, by plastic deformation using, for example, a shaped mandrel or hydraulic pressure.

The auto-drain unit 1 further comprises a discharge valve 35 which is fluidly connected to the outlet port 28 of the collection reservoir 27 such that, on opening the discharge valve 35, the liquid collected in the collection reservoir 27 is discharged therefrom, in this embodiment to atmosphere or to a collection vessel, under the pressure of the compressed gas. In this embodiment the discharge valve 35 is a pressure-operated valve and is configured to be actuated by the application of a predetermined pressure to a control port thereof.

The auto-drain unit 1 further comprises a trigger valve 37 which is fluidly connected to the reference chamber 25 and the control port of the discharge valve 35 such that, on actuation of the trigger valve 37, in this embodiment the opening of the trigger valve 37, the reference chamber 25 is in fluidly connected to the control port of the discharge valve 35 and the pressure in the reference chamber 25 is such as to actuate the discharge valve 35 and cause the same to be opened, leading to the discharge of the collected liquid from the collection reservoir 27.

The auto-drain unit 1 further comprises a mechanical connection 39 which connects the paddle member 31 and the trigger valve 37 and is configured to actuate the trigger valve 37 on a predetermined displacement of the paddle member 31.

The auto-drain unit 1 further comprises a fluid conduit 41, which acts as a snorkel and fluidly connects the reference chamber 25 and the main chamber 24 at a point located above the maximum possible level of liquid in the collection reservoir 27. The fluid conduit 41 includes a first, lower port 42 which is fluidly connected to the reference chamber 25 and a second, upper port 43 which is fluidly connected to the main chamber 24 at a location above the maximum level of liquid collectable in the collection reservoir 27. With this configuration, liquid cannot enter the reference chamber 25 directly, ensuring that the rate of accumulation of liquid in the reference chamber 25 is very much less than the rate of accumulation in the collection reservoir 27. In this embodiment the fluid conduit 41 includes a spray/mist separator element 44 at the upper, reservoir end 43 thereof to ensure that the entrained oil vapor or liquid aerosol present in the compressed gas stream condenses into the collection reservoir 27 rather than the reference chamber 25.

In this embodiment the diaphragm 23 and the reference chamber 25 are fabricated from materials which are not susceptible to pressure, oil or water damage, and the reference chamber 25 is fabricated from a material which discourages the growth of algae and other organic substances.

In use, as liquid accumulates in the collection reservoir 27 above the diaphragm 23, the biasing element 33 is compressed by an amount proportional to the weight of the collected liquid column. As the paddle member 31 descends under the weight of the collected liquid, the movement of the paddle member 31 acts mechanically through the mechanical connection 39 to actuate the trigger valve 37 at a predeterminable point, which actuation in turn actuates the discharge valve 35 by fluidly connecting the system pressure in the reference chamber 25 to the control port of the discharge valve 35, thereby causing the system pressure to vent the accumulated liquid from the collection reservoir 27. When the trigger valve 37 has just opened, there is a flow of gas therethrough which causes the pressure in the reference chamber 25 to be reduced with respect to the main chamber 24. This momentary pressure reduction is rapidly compensated for by gas flow through the fluid conduit 41, but, for its duration, the effect is to apply an impulse to the diaphragm 23 which acts further to bias the paddle member 31 downwardly and the trigger valve 37 to the open, actuated position. This desirable positive feedback improves the valve opening action. Immediately following the actuation of the discharge valve 35, the pressure in the main chamber 24 drops substantially due to the loss of compressed gas from the filter assembly 3. This momentary pressure differential applies an impulse to the diaphragm 23 which causes the diaphragm 23, and hence the paddle member 31, to rise, which in turn causes the closure of the trigger valve 37 and consequently the closure of the discharge valve 35.

With this configuration, the force exerted on the paddle member 31 is proportional to the difference in height between the column of liquid above the paddle member 31 and any column of liquid in the fluid conduit 41. Best operation is achieved when the column of liquid in the fluid conduit 41 is below the level of the paddle member 31, or, more ideally, when the reference chamber 25 is substantially dry.

It is a significant feature of the present invention that the reference chamber 25 does not have to remain dry. Over a long period of time, liquid will inevitably accumulate within the reference chamber 25, owing to the condensation of vapor therein or the transport of liquid through the fluid conduit 41. As long as the amount of liquid which collects in the reference chamber 25 does not result in a liquid level in the fluid conduit 41 which is significantly higher than the level of the diaphragm 23, operation will not be effected.

FIGS. 2 to 8 illustrate an auto-drain unit 101 in accordance with a first embodiment of the present invention as incorporated in a filter assembly 103.

The filter assembly 103 includes a filter bowl 107 which includes a threaded aperture 30 109 in the bottom thereof.

The auto-drain unit 101 comprises an attachment body 105 which is fitted to the filter bowl 107 of the filter assembly 103.

The attachment body 105 includes a threaded section 111 on the outer surface thereof for threaded coupling in the threaded aperture 109 in the filter bowl 107, and an outwardly-directed flange 113 at one, the upper, end 115 thereof. The flange 113 defines an abutment surface 116 for an annular seal 117 which is located about the attachment body 105 and provides a seal between the attachment body 105 and the filter bowl 107.

The attachment body 105 includes a central through bore 118 which extends from the upper end 115 thereof to the other, lower, end 119 thereof. The bore 118 includes a first section 120 of a first inner diameter at the upper end 115 thereof, a second section 121 of a second inner diameter at the lower end 119 thereof, and a third section 122 of a third inner diameter between the first and second sections 120, 121. The third, 15 central section 122 has a smaller inner diameter than the first and second sections 120, 121 and defines first and second abutment surfaces 125, 127 at the respective junctions therewith which face respective ones of the upper and lower ends 115, 119 of the attachment body 105.

The auto-drain unit 101 further comprises a cylinder assembly 128 which is disposed in the bore 118 in the attachment body 105. The cylinder assembly 128 comprises a tubular member 129 which is slideably disposed in the bore 118 in the attachment body 105 and extends in part beyond the lower end 119 thereof, a collar 130 which is attached to the tubular member 129 outside of the attachment body 105, and a biasing element 131, in this embodiment a compression spring, for biasing the tubular member 129 outwardly of the attachment body 105. As will be described in more detail hereinbelow, the function of the cylinder assembly 128 is to provide for the manual operation of the auto-drain unit 101 by depressing the tubular member 129 into the attachment body 105.

The tubular member 129 includes a through bore 132 which extends from one, the upper, end 133 thereof to the other, lower, end 134 thereof, through which bore 132 liquid is discharged to atmosphere or a suitable collection vessel on actuation of the auto-drain unit 101.

The tubular member 129 comprises a first, main section 135 which has an outer diameter which is substantially the same as the inner diameter of the third, central section 122 of the bore 118 in the attachment body 105 so as to be a close sliding fit therein. The main section 135 includes an annular grove 136 in the outer surface thereof, which groove 135 includes an annular seal 137 for maintaining a fluid-tight seal between the cylinder member 129 and the attachment body 105.

The tubular member 129 further includes a second, head section 138 at the upper end 133 thereof which has a larger outer diameter than the main section 135 thereof, the outer diameter of the head section 138 being substantially the same as the inner diameter of the first section 120 of the bore 118 in the attachment body 105 so as to be a close sliding fit therein. The head section 138 defines an abutment surface 139 on the outer surface thereof at the junction with the main section 135, which abutment surface 139 abuts the first abutment surface 125 in the bore 118 in the attachment body 105 when the tubular member 129 is biased downwardly in a direction from the lower end 119 of the attachment body 105 and prevents the escape of the tubular member 129 from the attachment body 105. The head section 138 further includes an annular groove 140 in the inner surface thereof which defines an upper region of the bore 132, which groove 140 includes an annular seal 141, in this embodiment a annular lip seal.

The tubular member 129 further includes a third, tail section 142 at the lower end 134 thereof to which the collar 130 is fitted and through which liquid is discharged to atmosphere or a suitable vessel. The tail section 142 has a smaller outer diameter than the main section 135 and defines an abutment surface 143 on the outer surface thereof at the junction with the main section 135, which abutment surface 143 is abutted by the collar 130. The tail section 142 includes an annular groove 145 in the outer surface thereof for receiving a clip 147 for fixing the collar 130 to the tubular member 129 in abutment with the abutment surface 143. The biasing element 131 is located between the second abutment surface 127 on the attachment body 105 and the collar 130 to bias the tubular member 129 in a downward direction outwardly of the attachment body 105.

The auto-drain unit 101 further comprises a main housing 151 which is attached, in this embodiment clipped, to the upper end 115 of the attachment body 105.

The main housing 151 includes a first axially-extending annular flange 153 at one, the lower, surface 155 thereof, which flange 153 is attached, in this embodiment clipped, to the upper end of 115 of the attachment body 105. The flange 153 includes a plurality of apertures 157 for providing a fluid communication path to the upper end 133 of the tubular member 129.

The main housing 151 further includes a second axially-extending annular flange 159 which is disposed adjacent the periphery of the other, upper, surface 161 thereof, which flange 159 in part defines a reference chamber 163 which is in fluid communication with the compressed gas supply as will be described in more detail hereinbelow. The flange 159 includes an aperture 164 therein for providing a fluid communication path thereacross.

The main housing 151 further includes an annular groove 165 in the outer peripheral surface thereof, which groove 165 includes an annular seal 166 for providing a fluid-tight seal with an outer sleeve 205 as will be described in more detail hereinbelow.

The main housing 151 further includes a pivot support 167 disposed adjacent the flange 159 for pivotally supporting a paddle unit 220 as will be described in more detail hereinbelow. In this embodiment the pivot support 167 is located adjacent the aperture 164 in the flange 159.

The main housing 151 further includes a valve seat 171 which is disposed at the upper surface 161 thereof to one side of the pivot support 167, in this embodiment adjacent the aperture 164 in the flange 159.

The main housing 151 further includes an axially-extending piston bore 173 which is axially aligned with the tubular member 129 of the cylinder assembly 128 and extends inwardly from the lower end of the flange 153.

The main housing 151 further includes a fluid conduit 175 which fluidly connects the inner end of the piston bore 173 to the valve seat 171.

The auto-drain unit 101 further comprises a piston unit 177 which is slideably disposed both in the tubular member 129 of the cylinder assembly 128 and the piston bore 173 in the main housing 151. The piston unit 177 and the annular seal 141 in the head section 138 of the tubular member 129 together provide a discharge valve which is actuatable to vent the filter bowl 107 to atmosphere or a suitable collection vessel and allow the discharge of collected liquid under the action of the system pressure.

The piston unit 177 includes a piston head 179 at one, the lower, end 181 thereof which has an outer diameter which is such as to provide a fluid-tight seal with the inner surface of the annular seal 141 in the head section 138 of the tubular member 129.

The piston unit 177 further includes a drive piston 183 at the other, upper, end 184 thereof which has an outer diameter which is substantially the same as the inner diameter of the piston bore 173 in the support body 151 so as to be a close sliding fit therein. The drive piston 183 includes an annular groove 186 in the outer surface thereof, which groove 186 includes an annular seal 187 for providing a fluid-tight seal between the piston bore 173 and the drive piston 183.

The piston unit 177 further includes a piston stem 189 which has a smaller outer diameter than the piston head 179 and connects the piston head 179 to the drive piston 183. The outer diameter of the piston stem 189 is such as to provide an annular gap thereabout when located in the annular seal 141 in the head section 138 of the tubular member 129.

The piston unit 177 further includes a through bore 191 which serves as a bleed path to allow for the return of the piston unit 177 to the closed, non-actuated position as will be described in more detail hereinbelow. The bore 191 includes a first section 193 of a first, very small inner diameter at the lower end 181 thereof which section 193 is dimensioned to provide a high resistance to fluid flow therethrough but yet provide a bleeding function. The bore 191 further includes a second, intermediate section 195 of a second inner diameter which is larger than the inner diameter of the first section 193. The bore 191 includes a third section 197 at the upper end 184 thereof which has a larger diameter than the second section 195 and defines an abutment surface 199 at the junction therewith. The third section 197 includes a biasing element 201, in this embodiment a compression spring, which abuts the abutment surface 199 and the inner end of the piston bore 173 so as to bias the piston unit 177 outwardly. As will be described in more detail hereinbelow, the function of the biasing element 201 is to drive the piston unit 177 to the open, actuated position when there is no system pressure, thereby providing for the draining of the filter assembly 103 on system shutdown.

The auto-drain unit 101 further comprises first and second co-axial sleeves 203, 205, in this embodiment cylindrical sleeves, which are fixed to the periphery of the main housing 151 and define a fluid conduit 207 which acts as a snorkel and fluidly connects the aperture 164 in the flange 159 at the upper surface 161 of the main housing 151, and hence the reference chamber 163, to a location which is a predetermined height above the upper surface 161 of the main housing 151 and represents a height within the filter bowl 107 above the maximum possible liquid level therein.

The inner sleeve 203 includes an inwardly-directed peripheral flange 209 at one, the lower, end 211 thereof which is located on the flange 159 at the upper surface 161 of the main housing 151 and sealingly attached thereto. The inner sleeve 203 further includes a plurality of outwardly-extending bosses 213, each having a through hole 215 therein, which are located at a position to the other side of the flange 209 and provide liquid transfer ports.

The outer sleeve 205 is a fluid-tight seal at the periphery of the main housing 151, being sealingly-engaged to the seal 166 in the outer peripheral surface thereof, and includes a plurality of apertures 217 in registration with the bosses 213 on the inner sleeve 203.

Figure 4:
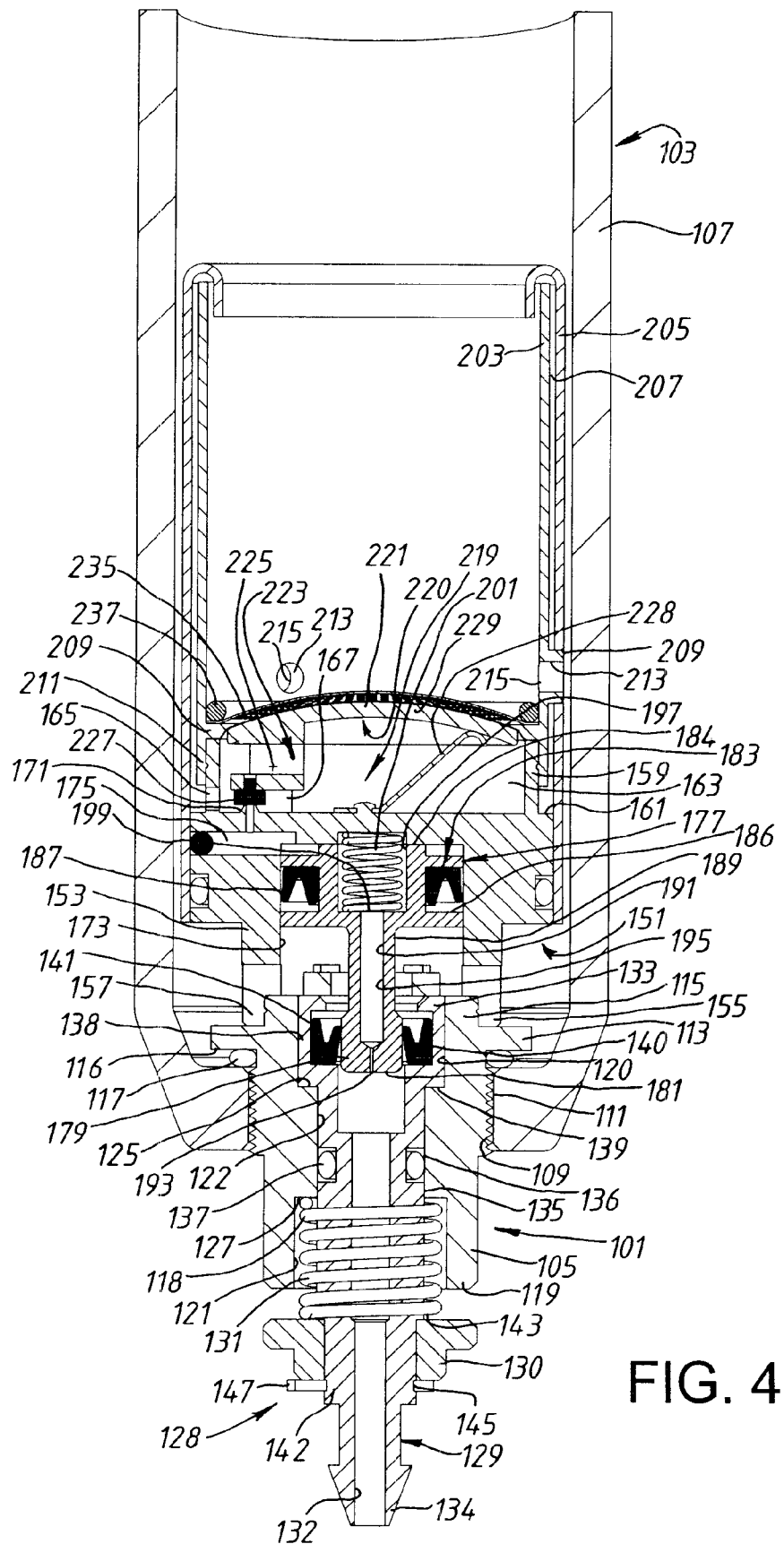
FIG. 4 illustrates a vertical sectional view of the auto-drain unit of FIG. 1, illustrated empty and with the trigger and discharge valves in the closed positions.
Figure 7:
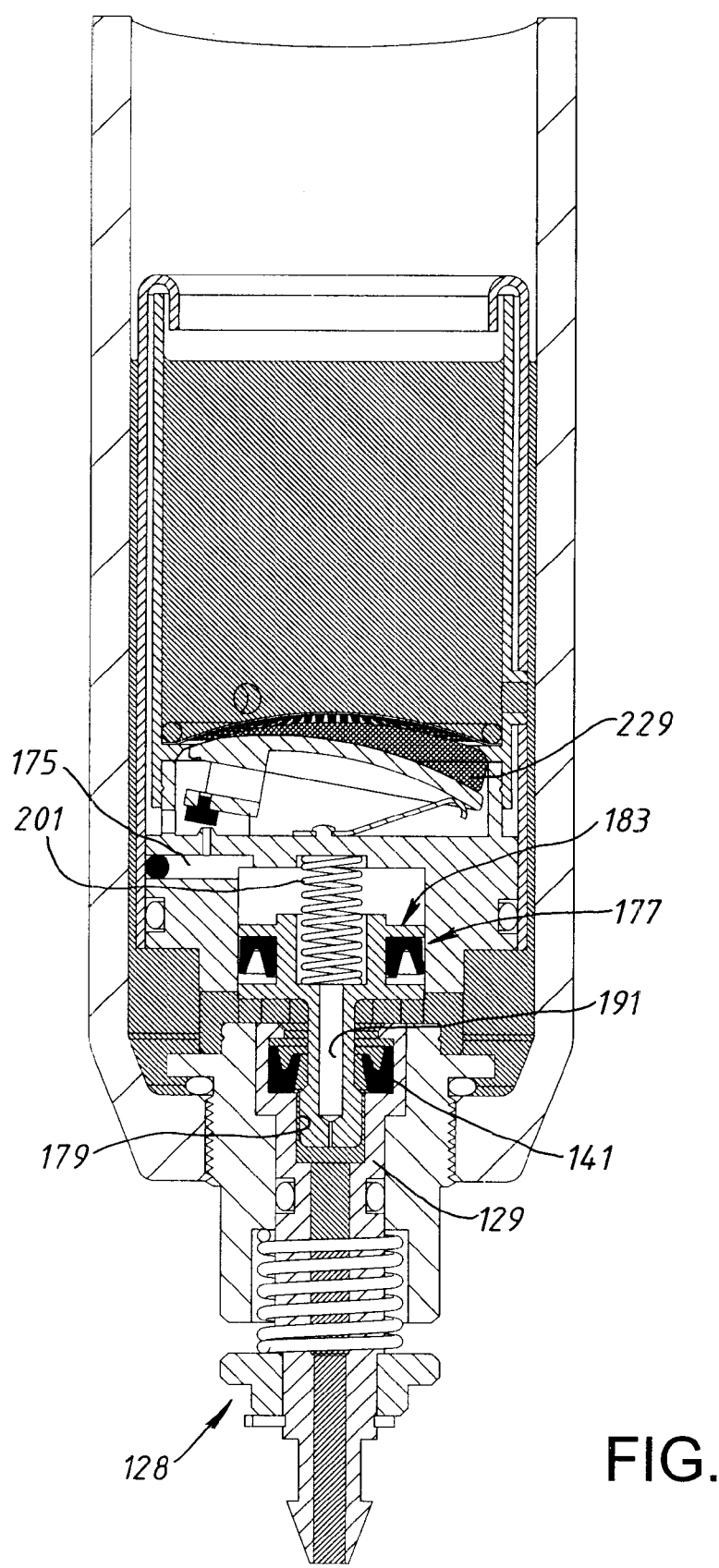
FIG. 7 illustrates a vertical sectional view of the auto-drain unit of FIG. 1, illustrated full and with the trigger and discharge valves in the open, actuated positions.

The auto-drain unit 101 further comprises a paddle assembly 219, which together with the valve seat 171 provides a trigger valve for actuating the discharge valve. The paddle assembly 219 comprises a paddle unit 220 which comprises a paddle member 221, in this embodiment a circular member having a part-spherical upper surface, which is located in the aperture defined by the flange 209 on the inner sleeve 203, and an arm member 223 which extends from the peripheral edge at the other, lower, surface of the paddle member 221. The arm member 223 includes a pivot pin 225 which is engaged to the pivot support 167 on the main housing 151 to allow for pivoting of the same between a first, non-actuated position (as illustrated in FIG. 4) and an actuated position (as illustrated in FIG. 7). The arm member 223 further includes a valve pad 227, in this embodiment a soft polymer pad, which is configured to be located on the valve seat 171 when the paddle unit 220 is in the closed, non-actuated position, and thereby close the fluid conduit 175 to the system pressure, and be raised from the valve seat 171 to provide fluid communication between the fluid conduit 175 and the system pressure when the paddle unit 220 is in the open, actuated position.

The paddle assembly 219 further comprises a biasing element 228, in this embodiment a light leaf spring, which is fixed to the upper surface 161 of the main housing 151 and acts on the paddle member 221 at a point opposite the arm member 223 to bias the paddle member 221 to the closed, non-actuated position.

The auto-drain unit 101 further comprises a diaphragm 229 which is sealingly attached to the flange 209 on the inner sleeve 203 and in part encloses the reference chamber 163 at the upper surface 161 of the main housing 151. The diaphragm 229 is a thin film which is sufficiently oversized as to be slack and floppy and provide for the direct force transfer of the weight of liquid collected thereabove to the paddle member 221 disposed therebelow. In this embodiment the diaphragm 229 is pre-formed so as to adopt an upwardly convex form when acted from below by the paddle member 221 (as illustrated in FIG. 4) and follow the contour of the paddle member 221 when moved to the paddle unit 220 is in the actuated position (as illustrated in FIG. 7). Suitable materials for the diaphragm 229 include PEEBAX Polyamide/Polyether MXI205 SN 01 and B F GOODRICH Estane 58887+5% 58236, with typical thicknesses of 30 and 50 $\mu$m. Fluid communication to the reference chamber 163 is through only the aperture 164 in the flange 159 at the upper surface 161 of the main housing 151. As described hereinabove, the aperture 164 in the flange 159 is fluidly connected to the fluid conduit 207 which opens at a height above the maximum level of liquid collectable in the filter bowl 107. With this configuration, the reference chamber 163 is at the system pressure and is separated from the collected liquid.

The auto-drain unit 101 further comprises a perforated plate 235 which is disposed above the diaphragm 229 on the flange 209 on the inner sleeve 203. The plate 235 includes a plurality of small apertures which act to prevent the diaphragm 229 from being exposed directly to large slugs of liquid as often developed on system start-up. The plate 235 is retained by an annular spring clip 237 which engages the inner surface of the inner sleeve 203.

The operation of the auto-drain unit 101 will now be described hereinbelow with reference to FIGS. 4 to 8 of the accompanying drawings.

In a first state, as illustrated in FIG. 4, the filter assembly 103 is at the system pressure and empty of liquid. In this state, the trigger and discharge valves are closed. The paddle unit 220 of the trigger valve is maintained in the closed position by the force of the system pressure acting on the valve pad 227 at the valve seat 171 and the force of the biasing element 228 which acts to bias the paddle unit 220 to the closed position when the system pressure is applied equally to the upper and lower surfaces of the diaphragm 229. The piston unit 177 of the discharge valve is maintained in the closed position by the application of the system pressure to the lower, forward surface of the drive piston 183.

Figure 5:
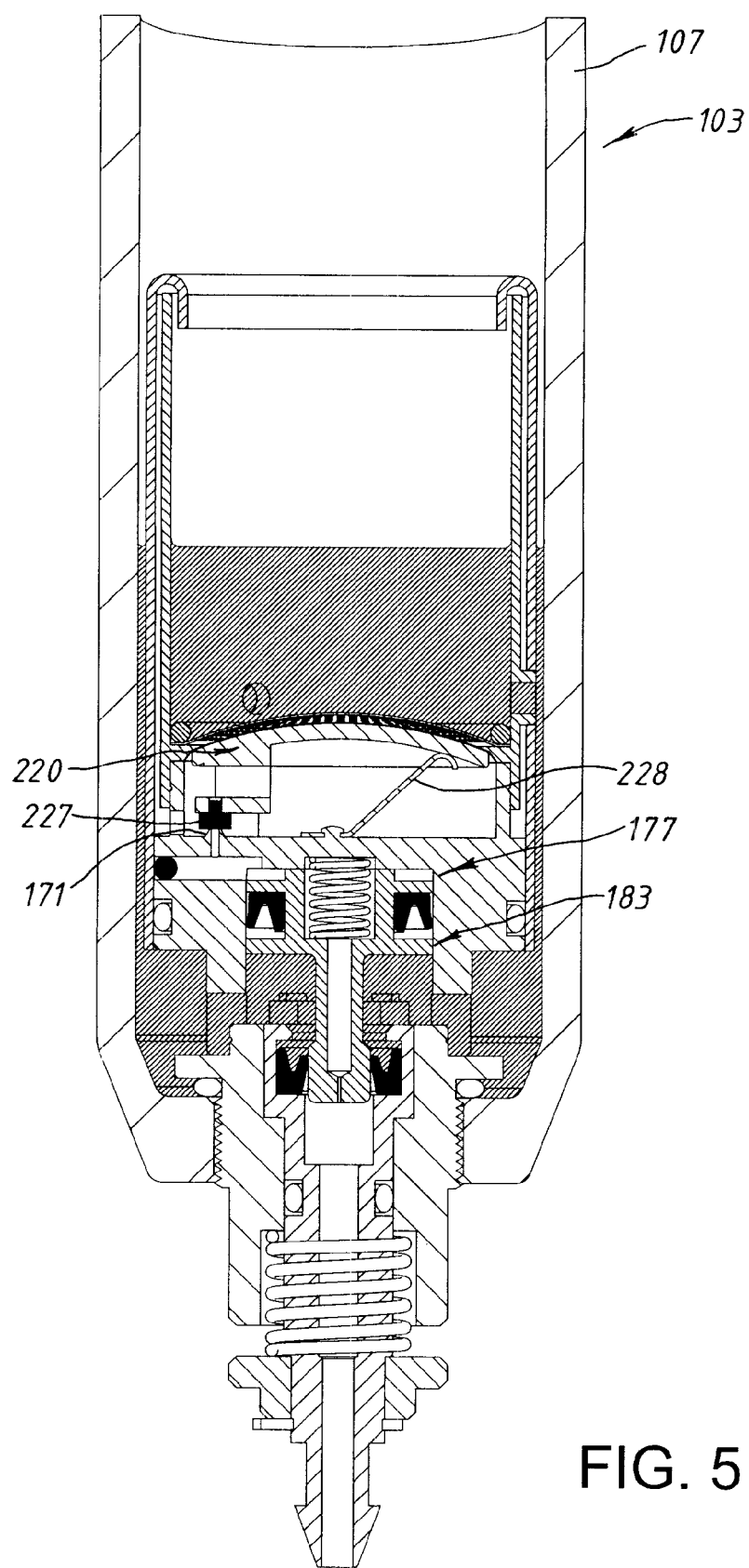
FIG. 5 illustrates a vertical sectional view of the auto-drain unit of FIG. 1, illustrated part-filled and with the trigger and discharge valves in the closed positions.

As illustrated in FIG. 5, the filter bowl 107 is in use progressively filled with liquid which has been separated by the filter assembly 103 from the compressed gas stream. In a part-filled state, the trigger and discharge valves are closed. The paddle unit 220 of the trigger valve is loaded by the column of liquid thereabove, but force of the system pressure acting on the valve pad 227 at the valve seat 171 and the biasing force of the biasing element 228 is greater than the loading force of the column of liquid and the paddle unit 220 is maintained in the closed position. The piston unit 177 of the discharge valve is maintained in the closed position by the application of the system pressure to the lower, forward surface of the drive piston 183.

Figure 6:
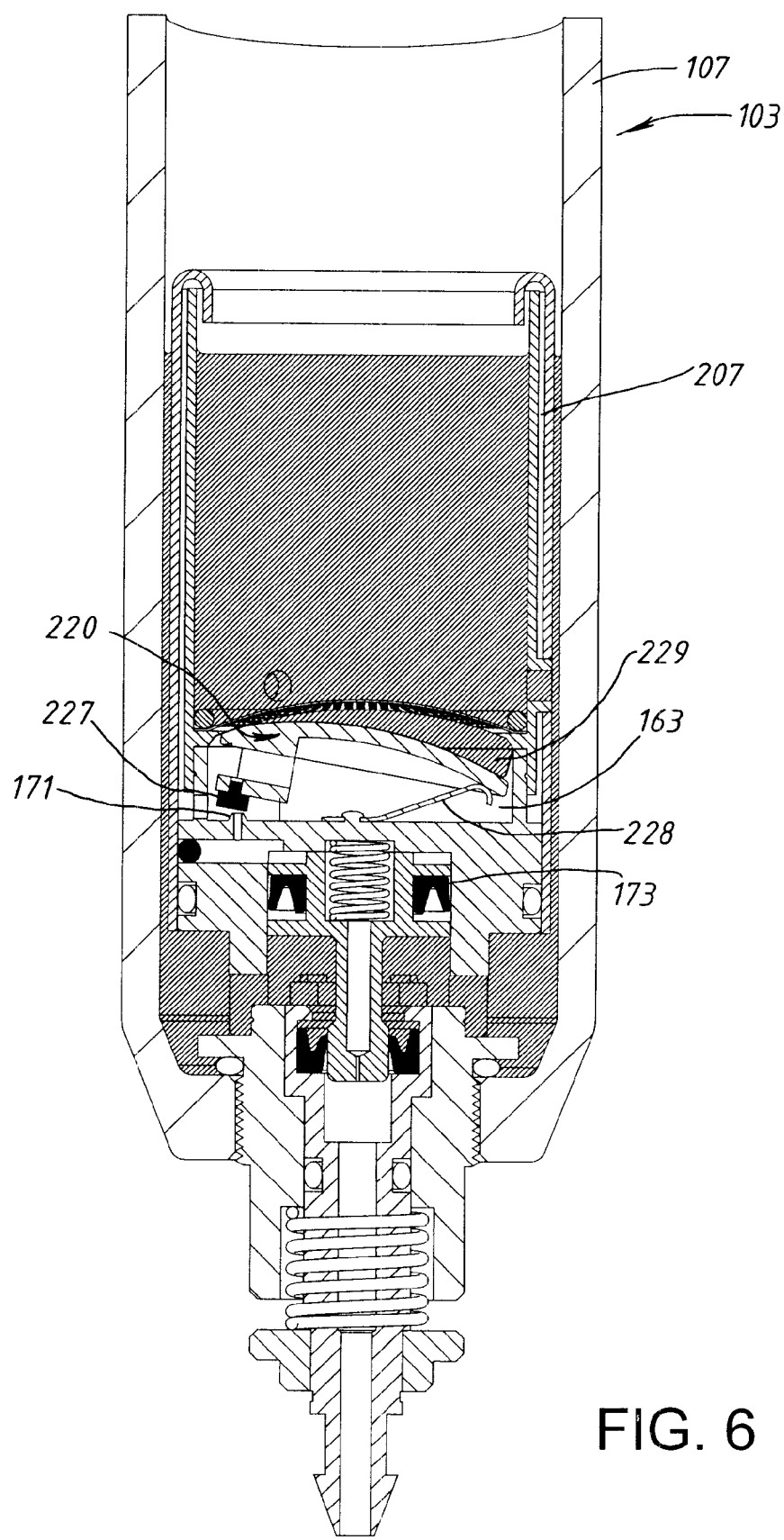
FIG. 6 illustrates a vertical sectional view of the auto-drain unit of FIG. 1, illustrated full and with the trigger valve in the open, actuated position and the discharge valve in the closed position.

When the level of liquid reaches a predeterminable threshold level for a given system pressure, as illustrated in FIG. 6, the trigger valve is actuated by the pivoting of the paddle unit 220 to raise the valve pad 227 from the valve seat 171. The pivoting of the paddle unit 220 is caused by the load of the column of liquid thereabove exceeding the force of the system pressure acting on the valve pad 227 at the valve seat 171 and the biasing force of the biasing element 228. When the trigger valve has just opened, there is a flow of gas from the reference chamber 163 to the piston bore 173 which causes the pressure in the reference chamber 163 to be reduced with respect to the main chamber. This momentary pressure reduction is rapidly compensated for by gas flow through the fluid conduit 207, but, for its duration, the effect is to apply an impulse to the diaphragm 229 to further bias the paddle unit 220 to the open position. This desirable positive feedback improves the valve opening action.

Almost instantaneously, as illustrated in FIG. 7, the piston unit 177 of the discharge valve is driven to the open, actuated position by the introduction of the system pressure to the fluid conduit 175 and the application of the system pressure on the upper, rear surface of the drive piston 183. In this embodiment the net force acting on the piston unit 177, achieved by the contributions of the force of the resilient element 201 and the force of the system pressure acting on the upper surface of the drive piston 183 and the exposed surface of the piston head 179 as offset by the force of the system pressure acting on the lower, forward surface of the drive piston 183 and the loss through the bore 191 in the piston unit 177, is such as to drive the piston unit 177 to the open, actuated position and open the discharge valve. With the piston unit 177 in the open position, an annular gap is created between the piston unit 177 and the annular seal 141 in the tubular member 129 which allows for the explosive discharge of the collected liquid through the tubular member 129 to atmosphere or a suitable collection vessel.

Figure 8:
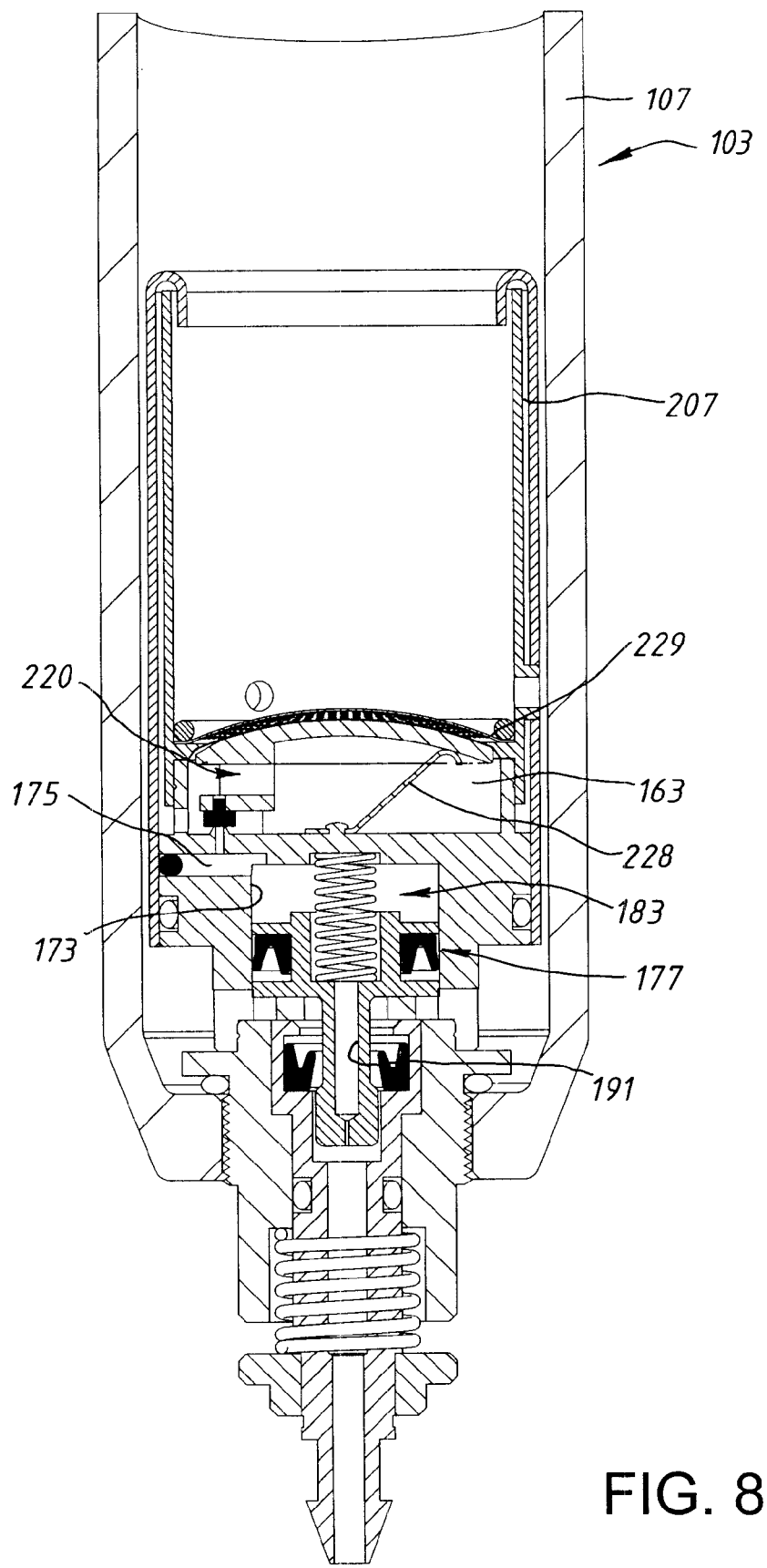
FIG. 8 illustrates a vertical sectional view of the auto-drain unit of FIG. 1, illustrated empty and with the trigger valve in the closed position and the discharge valve in the open, actuated position.
Figure 9:
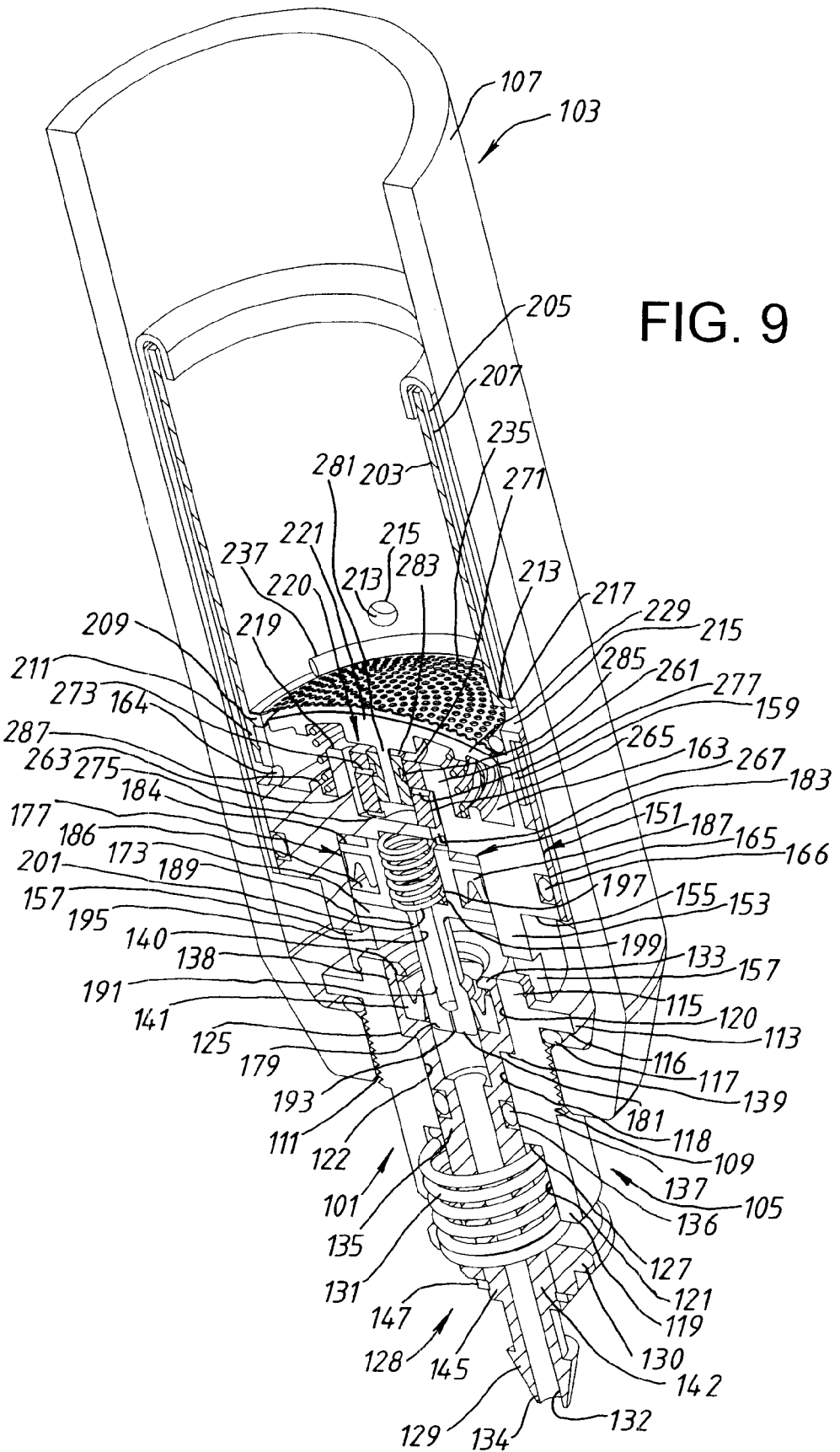
FIG. 9 illustrates a part cut-away perspective view of an auto-drain unit in accordance with a second embodiment of the present invention.
Figure 10:
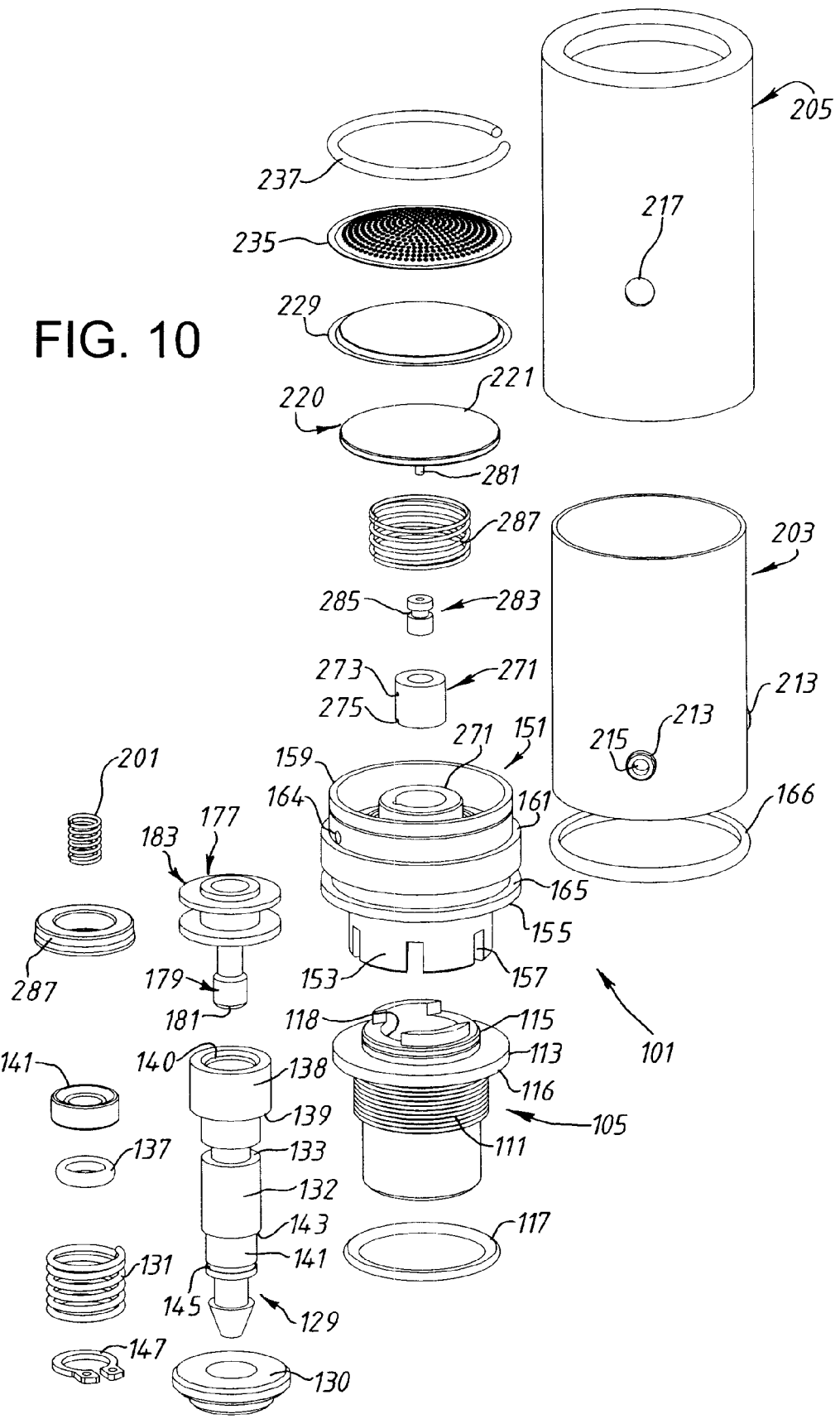
FIG. 10 illustrates an exploded perspective view of the auto-drain unit of FIG. 9.

Referring to FIG. 8, immediately following the operation of the discharge valve, the pressure in the main chamber drops substantially due to the rapid flow of compressed gas from the filter assembly 103. Although the pressures in the main chamber and the reference chamber 163 are equalized fairly rapidly, this pressure differential applies an impulse to the diaphragm 229 which is such as to return the diaphragm 229 to the raised position, allowing the paddle unit 220 to be returned to the closed position under the bias of the biasing element 228. In order to prevent damage to the diaphragm 229, the fluid conduit 207 should have a conductance which is sufficient to allow the reference chamber 163, which small compared to the main chamber, to equalize pressure rapidly.

As a result of the closure of the trigger valve, the system pressure is no longer applied to the fluid conduit 175 and hence the upper, rear surface of the drive piston 183, and the piston unit 177 returns to the closed position by the overriding action of the system pressure on the lower, forward surface of the drive piston 183. There is some delay in the return of the drive piston 183 to the closed position, and for this period of delay, collected liquid continues to be discharged. This delay is governed principally by the conductance of the compressed gas through the bore 191 in the piston unit 177 from the piston bore 173 at the rear surface of the drive piston 183.

With the piston unit 177 in the closed position, the trigger and discharge valves are closed and the cycle is then repeated as further liquid is collected in the filter bowl 107.

FIGS. 9 to 15 illustrate an auto-drain unit 101 in accordance with a second embodiment of the present invention as incorporated in a filter assembly 103.

The filter assembly 103 includes a filter bowl 107 which includes a threaded aperture 109 in the bottom thereof.

The auto-drain unit 101 comprises an attachment body 105 which is fitted to the filter bowl 107.

The attachment body 105 includes a threaded section 111 on the outer surface thereof for threaded coupling in the threaded aperture 109 in the filter bowl 107, and an outwardly-directed flange 113 at one, the upper, end 115 thereof. The flange 113 defines an abutment surface 116 for an annular seal 117 which is located about the attachment body 105 and provides a seal between the attachment body 105 and the filter bowl 107.

The attachment body 105 includes a central through bore 118 which extends from the upper end 115 thereof to the other, lower, end 119 thereof. The bore 118 includes a first section 120 of a first inner diameter at the upper end 115 thereof, a second section 121 of a second inner diameter at the lower end 119 thereof, and a third section 122 of a third inner diameter between the first and second sections 120, 121. The third, central section 122 has a smaller inner diameter than the first and second sections 120, 121 and defines first and second abutment surfaces 125, 127 at the respective junctions therewith which face respective ones of the upper and lower ends 115, 119 of the attachment body 105.

The auto-drain unit 101 further comprises a cylinder assembly 128 which is disposed in the bore 118 in the attachment body 105. The cylinder assembly 128 comprises a tubular member 129 which is slideably disposed in the bore 118 in the attachment body 105 and extends in part from the lower end 119 thereof, a collar 130 which is attached to the tubular member 129 outside of the attachment body 105, and a biasing element 131. in this embodiment a compression spring, for biasing the tubular member 129 outwardly of the attachment body 105. As will be described in more detail hereinbelow, the function of the cylinder assembly 128 is to provide for the manual operation of the auto-drain unit 101 by depressing the tubular member 129 into the attachment body 105.

The tubular member 129 includes a through bore 132 which extends from one, the upper, end 133 thereof to the other, lower, end 134 thereof, through which bore 132 liquid is discharged to atmosphere or a suitable collection vessel on actuation of the auto-drain unit 101.

The tubular member 129 comprises a first, main section 135 which has an outer diameter which is substantially the same as the inner diameter of the third, central section 122 of the bore 118 in the attachment body 105 so as to be a close sliding fit therein. The main section 135 includes an annular grove 136 in the outer surface thereof, which groove 135 includes an annular seal 137 for maintaining a fluid-tight seal between the tubular member 129 and the attachment body 105.

The tubular member 129 further includes a second, head section 138 at the upper end 133 thereof which has a larger outer diameter than the main section 135 thereof the outer diameter of the head section 138 being substantially the same as the inner diameter of the first section 120 of the bore 118 in the attachment body 105 so as to be a close sliding fit therein. The head section 138 defines an abutment surface 139 on the outer surface thereof at the junction with the main section 135, which abutment surface 139 abuts the first abutment surface 125 in the bore 118 in the attachment body 105 when the tubular member 129 is biased downwardly in a direction from the lower end 119 of the attachment body 105 and prevents the escape of the tubular member 129 from the attachment body 105. The head section 138 further includes an annular groove 140 in the inner surface thereof which defines an upper region of the bore 132, which groove 140 includes an annular seal 141, in this embodiment a annular lip seal.

The tubular member 129 further includes a third, tail section 142 at the lower end 134 thereof to which the collar 130 is fitted and through which liquid is discharged to atmosphere or a suitable collection vessel. The tail section 142 has a smaller outer diameter than the main section 135 and defines an abutment surface 143 on the outer surface thereof at the junction with the main section 135, which abutment surface 143 is abutted by the collar 130. The tail section 142 includes an annular groove 145 in the outer surface thereof for receiving a clip 147 for fixing the collar 130 to the tubular member 129 in abutment with the abutment surface 143. The biasing element 131 is located between the second abutment surface 127 on the attachment body 105 and the collar 130 to bias the tubular member 129 in a downward direction outwardly of the attachment body 105.

The auto-drain unit 101 further comprises a main housing 151 which is attached, in this embodiment clipped, to the upper end 115 of the attachment body 105.

The main housing 151 includes a first axially-extending annular flange 153 at one, the lower, surface 155 thereof, which flange 153 is attached, in this embodiment clipped, to the upper end of 115 of the attachment body 105. The flange 153 includes a plurality of apertures 157 for providing a fluid communication path to the upper end 133 of the tubular member 129.

The main housing 151 further includes a second axially-extending annular flange 159 which extends from and is disposed adjacent to the periphery of the other, upper, surface 161 thereof, which flange 159 in part defines a reference chamber 163 which is in fluid communication with the compressed gas supply as will be described in more detail hereinbelow. The flange 159 includes an aperture 164 therein for providing a fluid communication path thereacross.

The main housing 151 further includes an annular groove 165 in the outer peripheral surface thereof, which groove 165 includes an annular seal 166 for providing a fluid tight seal with an outer sleeve 205 as will be described in more detail hereinbelow.

The main housing 151 further includes an axially-extending piston bore 173 which is axially aligned with the tubular member 129 of the cylinder assembly 128 and extends inwardly from the lower end of the first flange 153 on the lower surface 155 thereof.

The main housing 151 further includes a third axially-extending annular flange 261 which extends from the upper surface 161 thereof and is co-axial with the second flange 159. The third flange 261 includes first and second separate fluid channels 263, 265 in the inner surface thereof. The first channel 263 extends axially along the entire length of the inner surface of the third flange 261. The second channel 265 extends axially from the inner end to a point substantially mid-way along the length of the inner surface of the third flange 261.

The main housing 151 further includes a fluid conduit 267 which fluidly connects the inner end of the piston bore 173 to the second channel 265 in the third flange 261.

The auto-drain unit 101 further comprises a piston unit 177 which is slideably disposed both in the tubular member 129 of the cylinder assembly 128 and the piston bore 173 in the main housing 151. The piston unit 177 and the annular seal 141 in the head section 138 of the tubular member 129 together provide a discharge valve which is actuatable to vent the filter bowl 107 to atmosphere or a suitable collection vessel and enable the discharge of collected liquid under the action of the system pressure.

The piston unit 177 includes a piston head 179 at one, the lower, end 181 thereof which has an outer diameter which is such as to provide a fluid-tight seal with the inner surface of the annular seal 141 in the head section 138 of the tubular member 129.

The piston unit 177 further includes a drive piston 183 at the other, upper, end 184 thereof which has an outer diameter which is substantially the same as the inner diameter of the piston bore 173 in the main housing 151 so as to be a close sliding fit therein. The drive piston 183 includes an annular groove 186 in the outer surface thereof, which groove 186 includes an annular seal 187 for providing a fluid-tight seal between the piston bore 173 and the drive piston 183.

The piston unit 177 further includes a piston stem 189 which has a smaller outer diameter than the piston head 179 and connects the piston head 179 to the drive piston 183. The outer diameter of the piston stem 189 is such as to provide an annular gap thereabout when located in the annular seal 141 in the head section 138 of the tubular member 129.

The piston unit 177 further includes a through bore 191 which serves as a bleed path to allow for the return of the piston unit 177 to the closed, non-actuated position as will be described in more detail hereinbelow. The bore 191 includes a first section 193 of a first, very small inner diameter at the lower end 181 thereof, which section 193 is dimensioned to provide a high resistance to fluid flow therethrough but yet provide a bleeding function. The bore 191 further includes a second, intermediate section 195 of a second inner diameter which is larger than the inner diameter of the first section 193. The bore 191 includes a third section 197 at the upper end 184 thereof which has a larger diameter than the second section 195 and defines an abutment surface 199 at the junction therewith. The third section 197 includes a biasing element 201, in this embodiment a compression spring, which abuts the abutment surface 199 and the inner end of the piston bore 173 so as to bias the piston unit 177 outwardly. As will be described in more detail hereinbelow, the function of the biasing element 201 is to drive the piston unit 177 to the actuated position when there is no system pressure, thereby providing for the draining of the filter assembly 103 on system shut-down.

The auto-drain unit 101 further comprises first and second co-axial sleeves 203, 205, in this embodiment cylindrical sleeves, which are fixed to the periphery of the main housing 151 and define a fluid conduit 207 which acts as a snorkel and fluidly connects the aperture 164 in the flange 159 at the upper surface 161 of the main housing 161, and hence the reference chamber 163, to a location which is a predetermined height above the upper surface 161 of the main housing 151 and represents a height within the filter bowl 107 above the maximum possible liquid level therein.

The inner sleeve 203 includes an inwardly-directed peripheral flange 209 at one, the lower, end 211 thereof which is located on the second flange 159 at the upper surface 161 of the main housing 151 and sealingly attached thereto. The inner sleeve 203 further includes a plurality of outwardly-extending bosses 213, each having a through hole 215 therein, which are located at a position to the other side of the flange 209 and provide liquid transfer ports.

The outer sleeve 205 is a fluid-tight seal about the periphery of the main housing 151, being sealingly-engaged to the annular seal 166 in the outer peripheral surface thereof, and includes a plurality of apertures 217 in registration with the bosses 213 on the inner sleeve 203.

The auto-drain unit 101 further comprises a valve sleeve 271, in this embodiment a tubular member formed of polytetrafluoroethylene (PTFE), which is sealingly fitted in the third flange 261 on the upper surface 161 of the main housing 151. The valve sleeve 271 includes first, second and third fluid conduits 273, 275, 277 which extend radially therethrough and are arranged such that the first and second conduits 273, 275 are fluidly connected to the first fluid channel 263 in the third flange 261 and the third fluid conduit 277 is fluidly connected to the second fluid channel 265 in the third flange 261.

The auto-drain unit 101 further comprises a paddle assembly 219 which together with the valve sleeve 271 provides a trigger valve for actuating the discharge valve. As will become apparent hereinbelow, the trigger valve is pressure balanced in the sense that the axial and radial pressure forces are each balanced.

Figure 11:
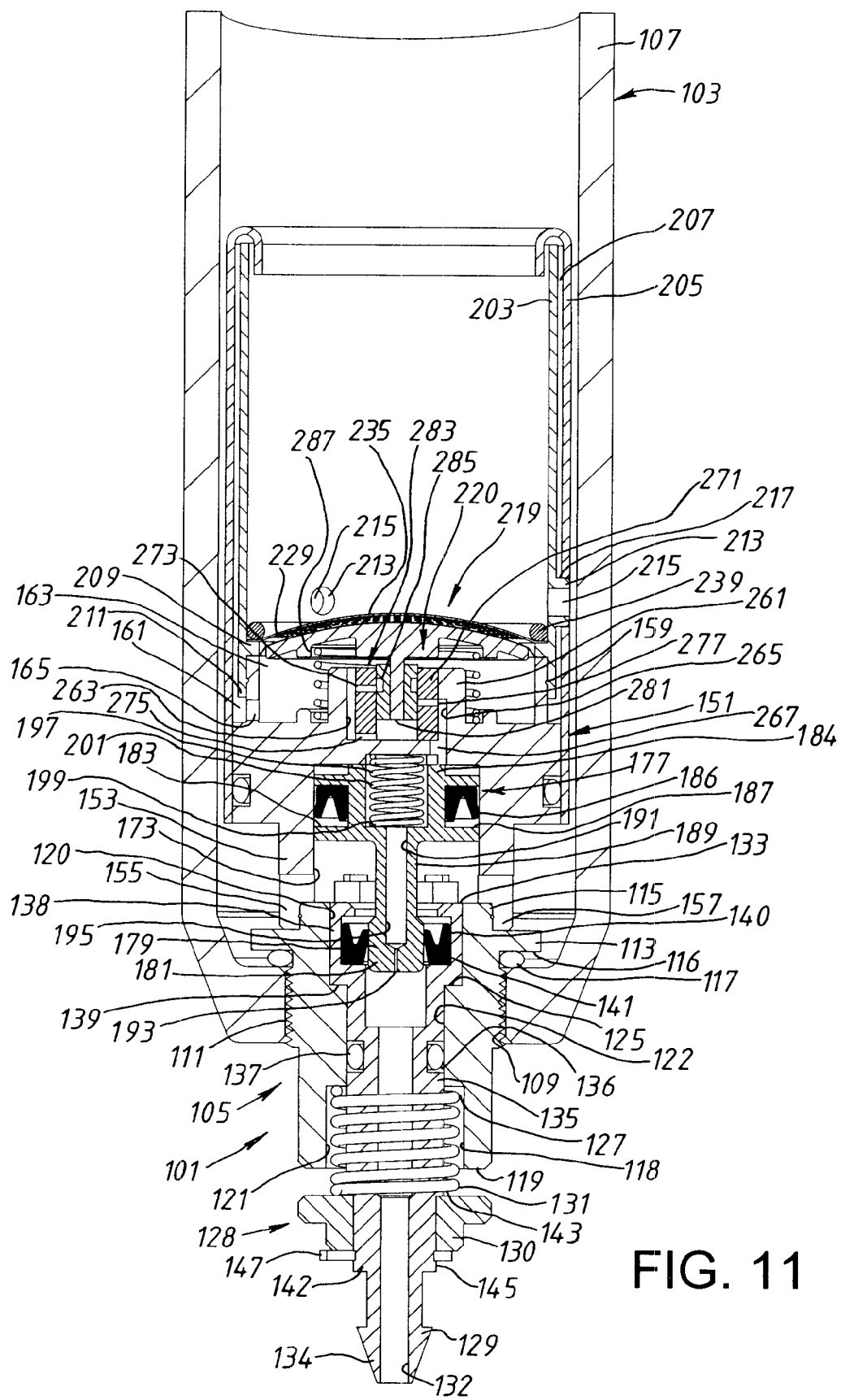
FIG. 11 illustrates a vertical sectional view of the auto-drain unit of FIG. 9, illustrated empty and with the trigger and discharge valves in the closed positions.
Figure 13:
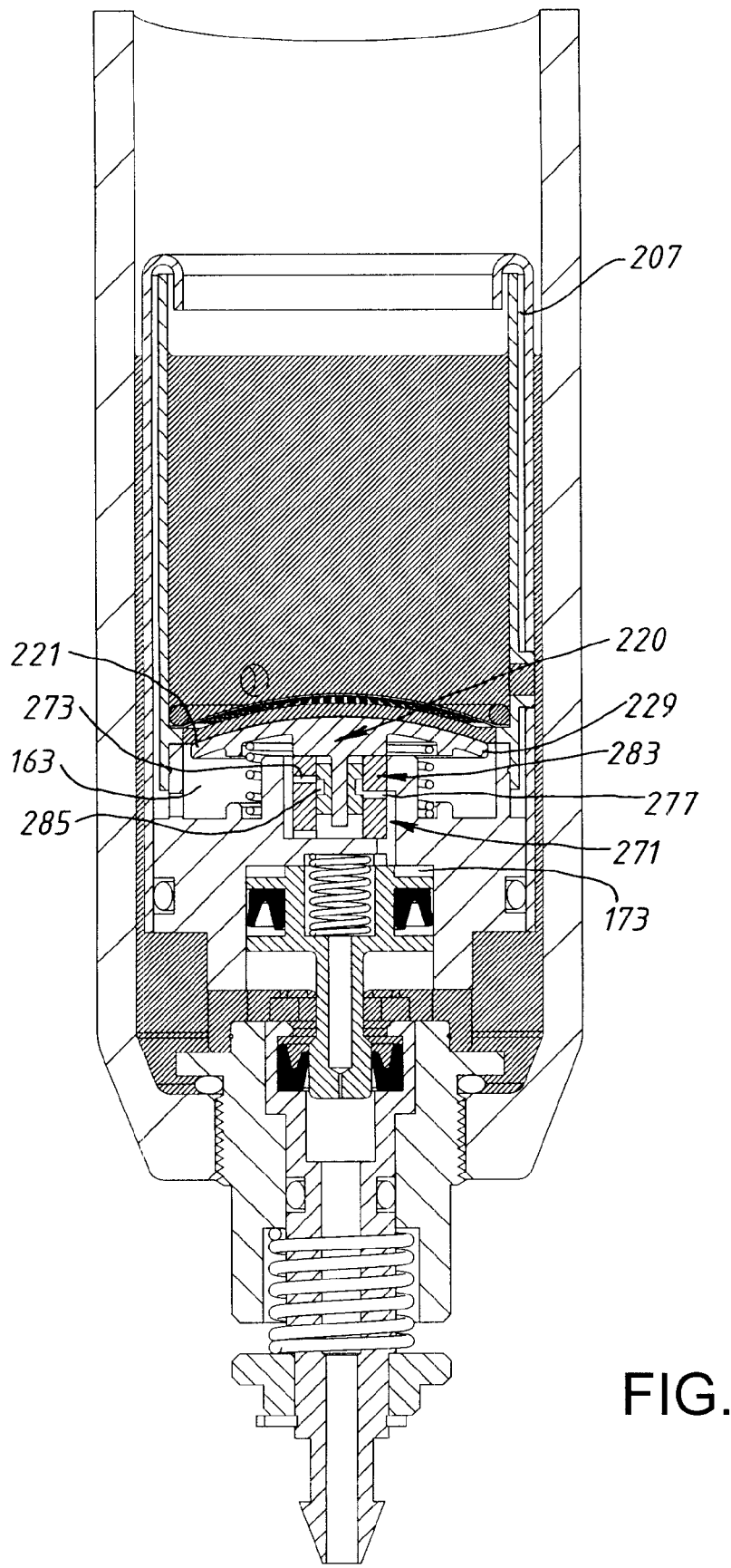
FIG. 13 illustrates a vertical sectional view of the auto-drain unit of FIG. 9, illustrated full and with the trigger valve in the open, actuated position and the discharge valve in the closed position.

The paddle assembly 219 comprises a paddle unit 220 which comprises a paddle member 221, in this embodiment a circular member having a part-spherical upper surface, which is located in the aperture defined by the flange 209 on the inner sleeve 203, and an axially-extending pin 281 which extends axially from the center of the other, lower, surface of the paddle member 221. As will be described in more detail hereinbelow, the paddle unit 220 is movable between a first, closed or non-actuated position (as illustrated in FIG. 11) and a second, open or actuated position (as illustrated in FIG. 13).

The paddle assembly 219 further comprises a bobbin 283 which is mounted to the pin 281 of the paddle unit 220 and has an outer diameter which is such as to provide a minimal clearance, preferably less than 0.05 mm, with the inner surface of the valve sleeve 271 in order to prevent substantial loss through the bore 191 in the piston unit 177 and hence from the filter assembly 103. The bobbin 283 includes an annular groove 285 in the outer surface thereof which is positioned and configured such as to be fluidly connected only to the first fluid conduit 273 in the valve sleeve 271 when the paddle unit 220 is in the first, closed position and fluidly connected to both the first and third fluid conduits 273, 277 in the valve sleeve 271 when the paddle unit 220 is in the second, open position.

The paddle assembly 219 further comprises a biasing element 287, in this embodiment a light compression spring, which is disposed between the upper surface 161 of the main housing 151 and the paddle unit 220 and acts to bias the paddle unit 220 to the closed, non-actuated position.

The auto-drain unit 101 further comprises a diaphragm 229 which is sealingly attached to the flange 209 on the inner sleeve 203 and in part encloses the reference chamber 163 at the upper surface 161 of the main housing 151. The diaphragm 229 is a thin film which is sufficiently oversized as to be slack and floppy and provide for the direct force transfer of the weight of liquid collected thereabove to the paddle member 221 disposed therebelow. In this embodiment the diaphragm 229 is pre-formed so as to adopt an upwardly convex form when acted from below by the paddle member 221 (as illustrated in FIG. 11) and follow the contour of the paddle member 221 when the paddle unit 220 is in the actuated position (as illustrated in FIG. 13). Suitable materials for the diaphragm 229 include PEEBAX Polyamide/Polyether MX1205 SN 01 and B F GOODRICH Estane 58887+5% 58236, with typical thicknesses of 30 and 50 μm. Fluid communication to the reference chamber 163 is through only the aperture 164 in the axially-extending flange 159 at the upper surface 161 of the main housing 151. As described hereinabove, the aperture 164 in the flange 159 is fluidly 5 connected to the fluid conduit 207 which opens at a height above the maximum possible level of liquid collectable in the filter bowl 107. With this configuration, the reference chamber 163 is at the system pressure and is separated from the collected liquid.

The auto-drain unit 101 further comprises a perforated plate 235 which is disposed above the diaphragm 229 on the flange 209 on the inner sleeve 203. The plate 235 includes a plurality of small apertures which act to prevent the diaphragm 229 from being exposed directly to large slugs of liquid as often developed on system start-up. The plate 235 is retained by an annular spring clip 237 which engages the inner surface 15 of the inner sleeve 203.

The operation of the auto-drain unit 101 will now be described hereinbelow with reference to FIGS. 11 to 15 of the accompanying drawings.

In a first state, as illustrated in FIG. 11, the filter assembly 103 is at the system pressure and empty of liquid. In this state, the trigger and discharge valves are closed. The paddle unit 220 of the trigger valve is maintained in the closed position by the biasing element 287 which acts to bias the paddle unit 220 to the closed position when the system pressure is applied equally to the upper and lower surfaces of the diaphragm 229. The piston unit 177 of the discharge valve is maintained in the closed position by the application of the system pressure to the lower, forward surface of the drive piston 183.

Figure 12:
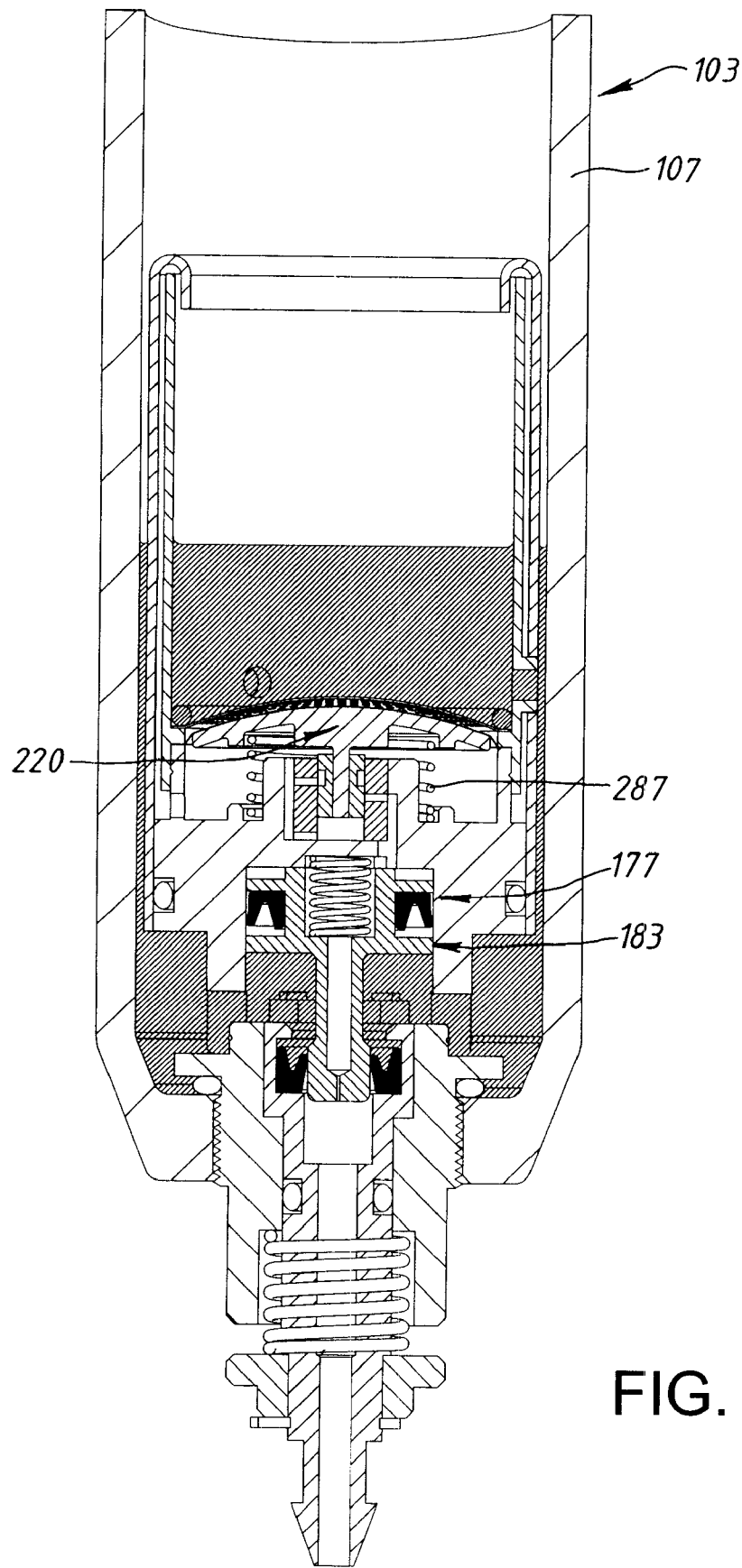
FIG. 12 illustrates a vertical sectional view of the auto-drain unit of FIG. 9, illustrated part-filled and with the trigger and discharge valves in the closed positions.

As illustrated in FIG. 12, the filter bowl 107 is in use progressively filled with liquid 30 which is separated by the filter assembly 103 from the compressed gas stream. In a part-filled state, the trigger and discharge valves are still closed. The paddle unit 220 of the trigger valve is loaded by the column of liquid thereabove, but the biasing force of the biasing element 287 is greater than the loading force of the column of liquid and the paddle unit 220 is maintained in the closed position. The piston unit 177 of the discharge valve is maintained in the closed position by the application of the system pressure to the lower, forward surface of the drive piston 183.

When the level of liquid reaches a predetermined threshold level, as illustrated in FIG. 13, the trigger valve is actuated by the downward movement of the paddle unit 220 to the actuated position. The paddle unit 220 is caused to be moved downwards by the load of the column of liquid, which acts on the paddle member 221 through the diaphragm 229, exceeding the biasing force of the biasing element 287. With the paddle unit 220 in the actuated position, the annular groove 285 in the bobbin 283 fluidly connects the first and third fluid conduits 273, 277 in the valve sleeve 271. When the trigger valve has just opened, there is a flow of gas from the reference chamber 163 to the piston bore 173 which causes the pressure in the reference chamber 163 to be reduced with respect to that of the main chamber. This momentary pressure reduction is rapidly compensated for by gas flow through the fluid conduit 207, but, for its duration, the effect is to apply an impulse to the diaphragm 229 to further bias the paddle unit 220 to the open position. This desirable positive feedback improves the valve opening action.

Figure 14:
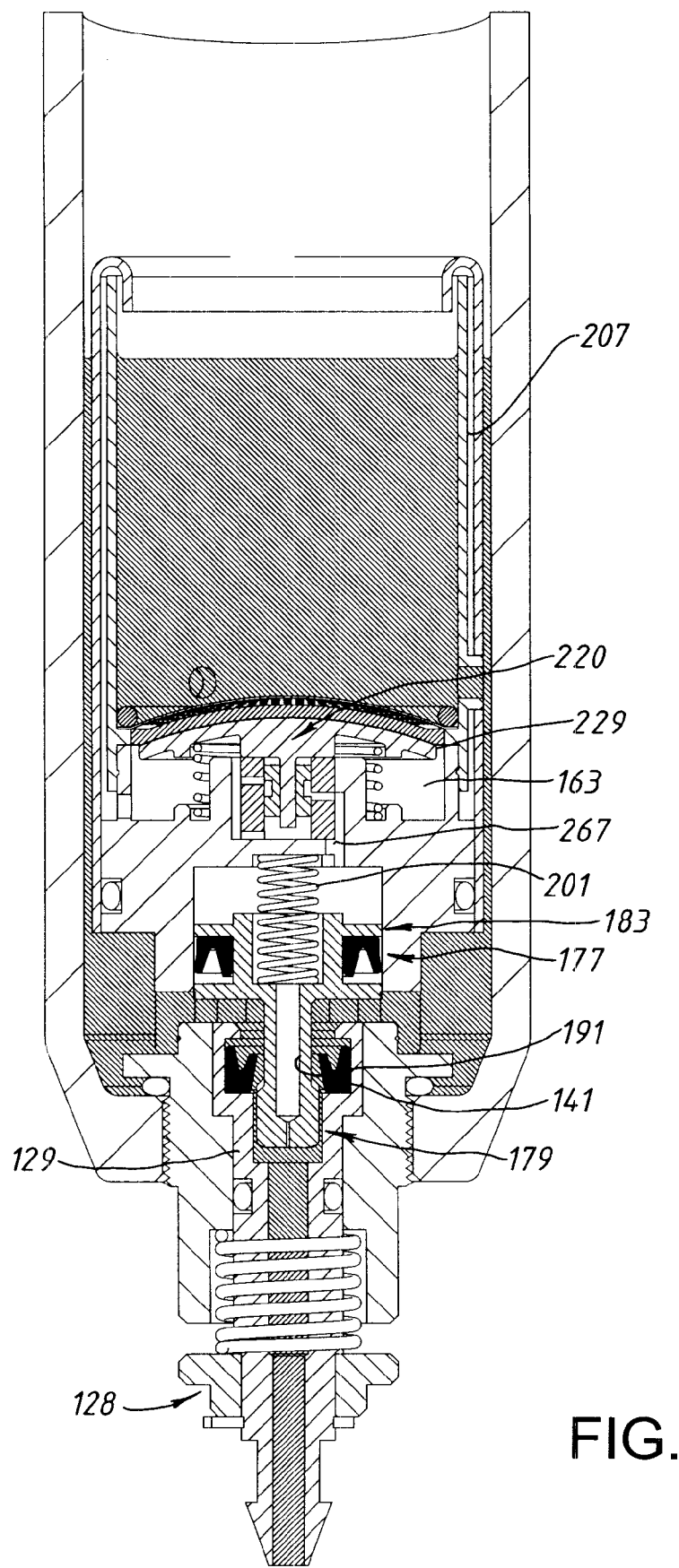
FIG. 14 illustrates a vertical sectional view of the auto-drain unit of FIG. 9, illustrated full and with the trigger and discharge valves in the open, actuated positions.

Almost instantaneously, as illustrated in FIG. 14, the piston unit 177 of the discharge valve is driven to the open, actuated position by the introduction of the system pressure to the fluid conduit 267 and the application of the system pressure on the upper, rear surface of the drive piston 183. In this embodiment the net force acting on the piston unit 177, achieved by the contributions of the force of the resilient element 201 and the force of the system pressure acting on the upper, rear surface of the drive piston 183 and the exposed surface of the piston head 179 as offset by the force of the system pressure acting on the lower, forward surface of the drive piston 183 and the loss through the bore 191 in the piston unit 177, is such as to drive the piston unit 177 to the open, actuated position and open the discharge valve. With the piston unit 177 in the open position, an annular gap is created between the piston unit 177 and the annular seal 141 in the tubular member 129 which allows for the explosive discharge of the collected liquid through the tubular member 129 to atmosphere or a suitable collection vessel.

Figure 15:
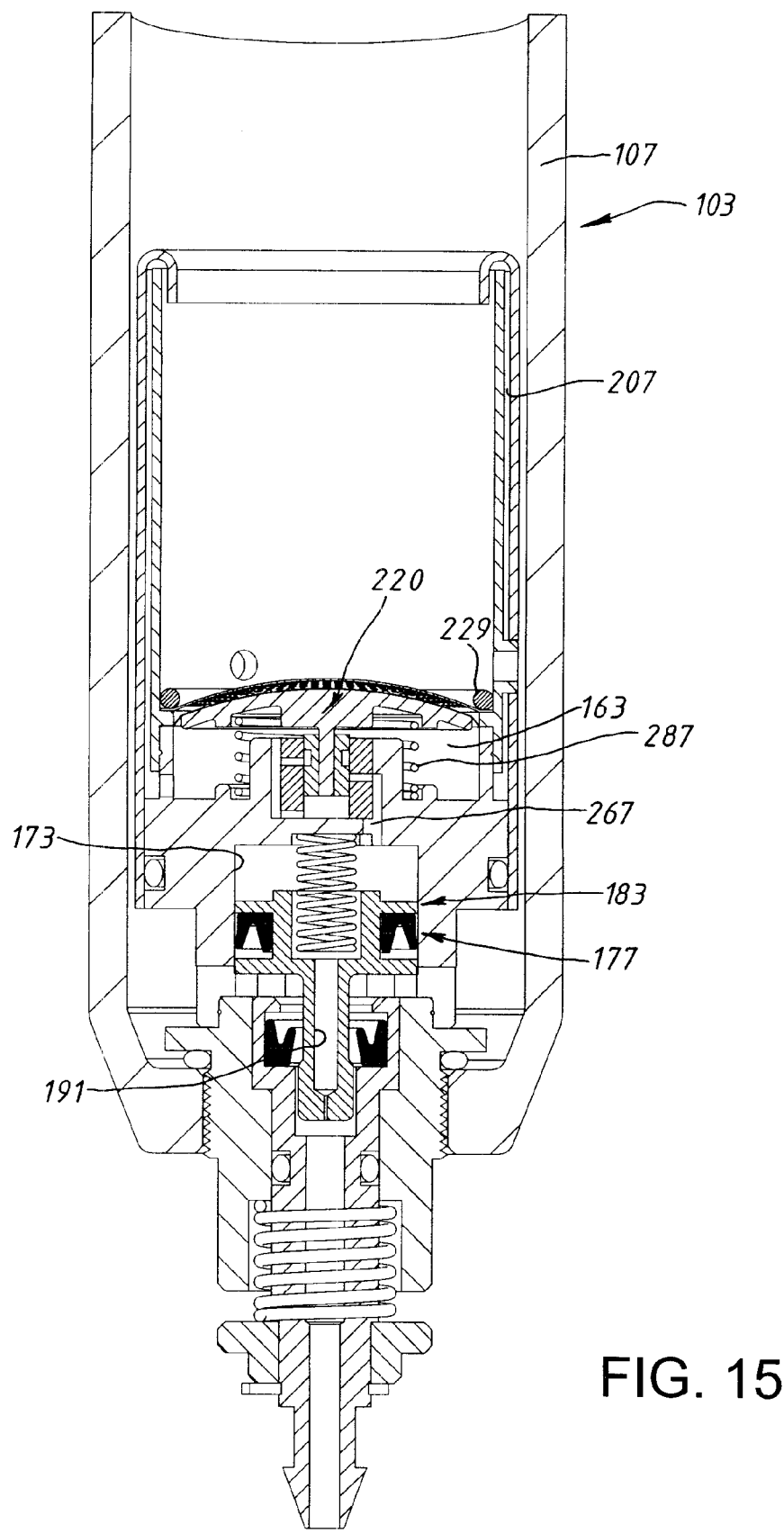
FIG. 15 illustrates a vertical sectional view of the auto-drain unit of FIG. 9, illustrated empty and with the trigger valve in the closed position and the discharge valve in the open, actuated position.
Figure 16:
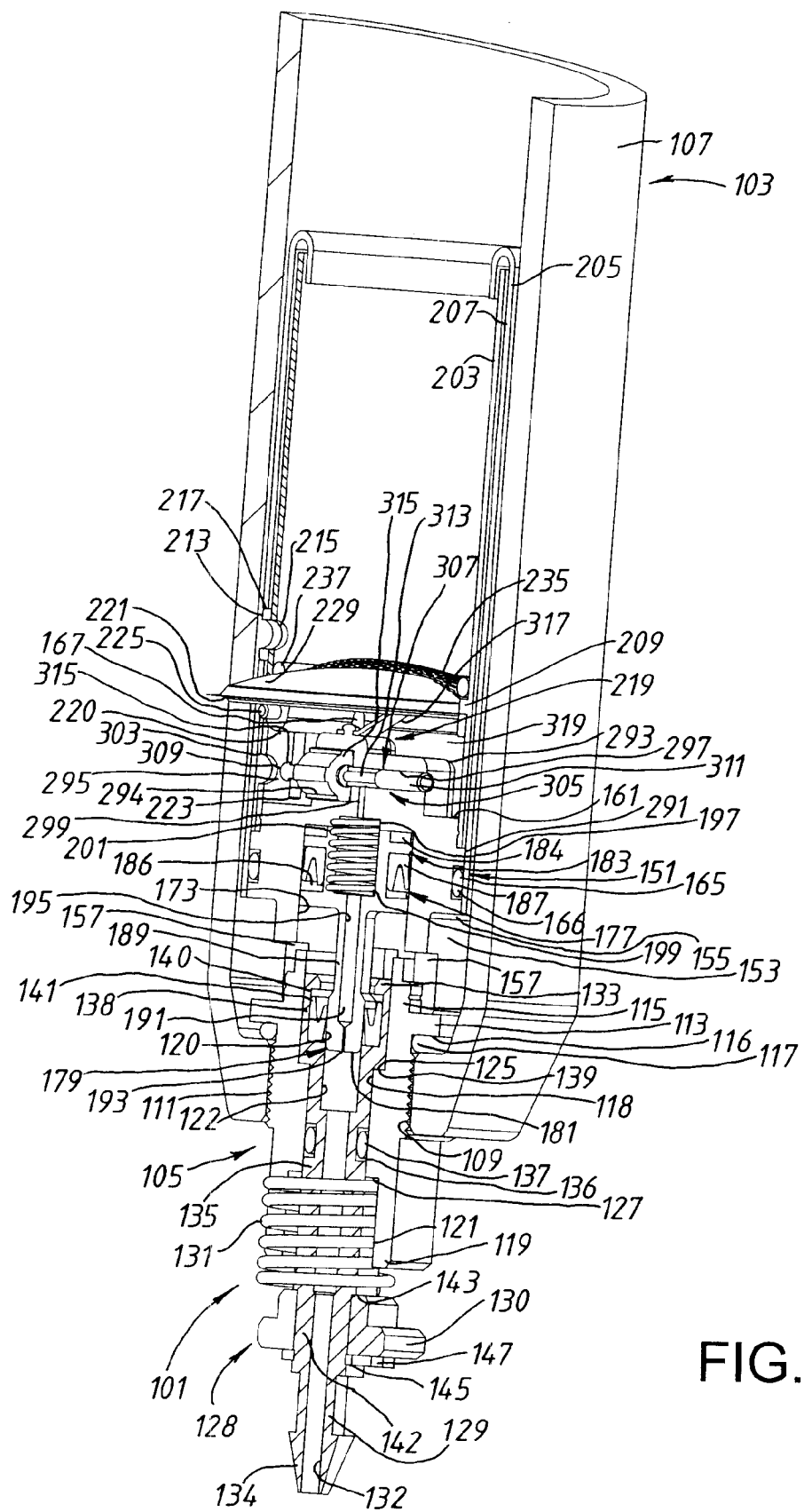
FIG. 16 illustrates a part cut-away perspective view of an auto-drain unit in accordance with a third embodiment of the present invention.
Figure 17:
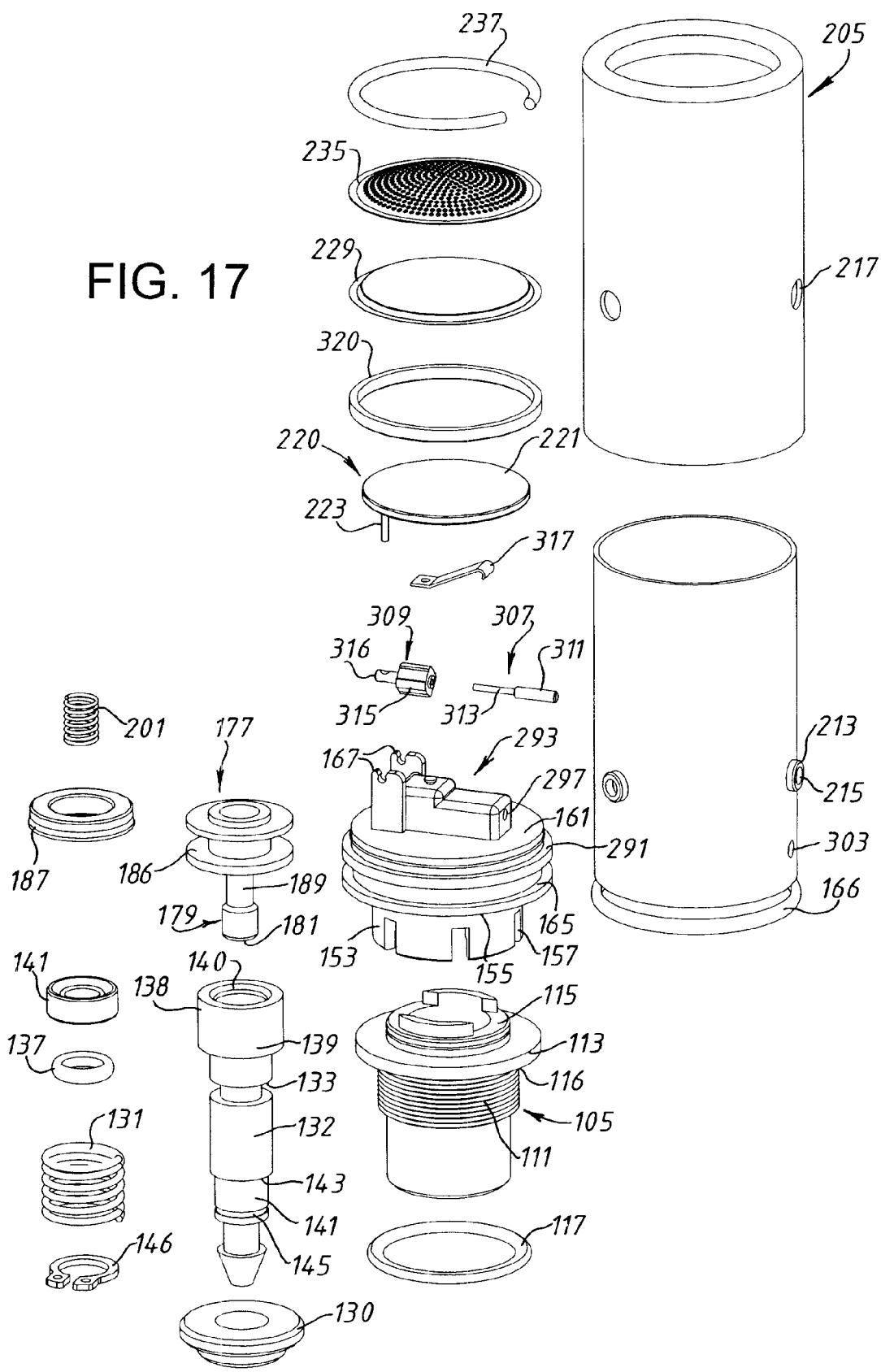
FIG. 17 illustrates an exploded perspective view of the auto-drain unit of FIG. 16.

Referring to FIG. 15, immediately following the operation of the discharge valve, the pressure in the main chamber drops substantially due to the rapid flow of gas from the filter assembly 103. Although the pressures in the main chamber and the reference chamber 163 are equalized fairly rapidly, this pressure differential applies an impulse to the diaphragm 229 which is such as to return the diaphragm 229 to the raised position, causing the paddle unit 220 to be returned to the closed position under the bias of the biasing element 287. In order to prevent damage to the diaphragm 229, the fluid conduit 207 should have a conductance which is sufficient to allow the reference chamber 163, which small compared to the main chamber, to equalize pressure rapidly.

As a result of closure of the trigger valve, the system pressure is no longer applied to the fluid conduit 267 and hence the upper, rear surface of the drive piston 183, and the piston unit 177 returns to the closed, non-actuated position by the over-riding action of the system pressure on the lower, forward surface of the drive piston 183. There is some delay in the return of the drive piston 183 to the closed position, and for this period of delay, collected liquid continues to be discharged. This delay is governed principally by the conductance of the compressed gas through the bore 191 in the piston unit 177 from the piston bore 173 at the rear surface of the drive piston 183.

With the piston unit 177 in the closed position, the trigger and discharge valves are closed and the cycle is then repeated as further liquid is collected in the filter bowl 107.

FIGS. 16 to 22 illustrate an auto-drain unit 101 in accordance with a third embodiment of the present invention as incorporated in a filter assembly 103.

The filter assembly 103 includes a filter bowl 107 which includes a threaded aperture 109 in the bottom thereof.

The auto-drain unit 101 comprises an attachment body 105 which is fitted to the filter bowl 107.

The attachment body 105 includes a threaded section 111 on the outer surface thereof for threaded coupling in the threaded aperture 109 in the filter bowl 107, and an outwardly-directed flange 113 at one, the upper, end 115 thereof. The flange 113 defines an abutment surface 116 for an annular seal 117 which is located about the attachment body 105 and provides a seal between the attachment body 105 and the filter bowl 107.

The attachment body 105 includes a central through bore 118 which extends from the upper end 115 thereof to the other, lower, end 119 thereof. The bore 118 includes a first section 120 of a first inner diameter at the upper end 115 thereof, a second section 121 of a second inner diameter at the lower end 119 thereof, and a third section 122 of a third inner diameter between the first and second sections 120, 121. The third, central section 122 has a smaller inner diameter than the first and second sections 120, 121 and defines first and second abutment surfaces 125, 127 at the respective junctions therewith which face respective ones of the upper and lower ends 115, 119 of the attachment body 105.

The auto-drain unit 101 further comprises a cylinder assembly 128 which is disposed in the bore 118 in the attachment body 105. The cylinder assembly 128 comprises a tubular member 129 which is slideably disposed in the bore 118 in the attachment body 105 and extends in part from the lower end 119 thereof, a collar 130 which is attached to the tubular member 129 outside of the attachment body 105, and a biasing element 131, in this embodiment a compression spring, for biasing the tubular member 129 outwardly of the attachment body 105. As will be described in more detail hereinbelow, the function of the cylinder assembly 128 is to provide for the manual operation of the auto-drain unit 101 by depressing the tubular member 129 into the attachment body 105.

The tubular member 129 includes a through bore 132 which extends from one, the upper, end 133 thereof to the other, lower, end 134 thereof, through which bore 132 liquid is discharged to atmosphere or a suitable collection vessel on actuation of the auto-drain unit 101.

The tubular member 129 includes a first, main section 135 which has an outer diameter which is substantially the same as the inner diameter of the third, central section 122 of the bore 118 in the attachment body 105 so as to be a close sliding fit therein. The main section 135 includes an annular grove 136 in the outer surface thereof, which groove 135 includes an annular seal 137 for maintaining a fluid-tight seal between the tubular member 129 and the attachment body 105.

The tubular member 129 further includes a second, head section 138 at the upper end 133 thereof which has a larger outer diameter than the main section 135 thereof, the outer diameter of the head section 138 being substantially the same as the inner diameter of the first section 120 of the bore 118 in the attachment body 105 so as to be a close sliding fit therein. The head section 138 defines an abutment surface 139 on the outer surface thereof at the junction with the main section 135, which abutment surface 139 abuts the first abutment surface 125 in the bore 118 in the attachment body 105 when the tubular member 129 is biased downwardly in a direction from the lower end 119 of the attachment body 105 and prevents the escape of the tubular member 129 from the attachment body 105. The head section 138 further includes an annular groove 140 in the inner surface thereof which defines an upper region of the bore 132, which groove 140 includes an annular seal 141, in this embodiment a annular lip seal.

The tubular member 129 further includes a third, tail section 142 at the lower end 134 thereof to which the collar 130 is fitted and through which liquid is discharged to atmosphere or a suitable vessel. The tail section 142 has a smaller outer diameter than the main section 135 and defines an abutment surface 143 on the outer surface thereof at the junction with the main section 135, which abutment surface 143 is abutted by the collar 130. The tail section 142 includes an annular groove 145 in the outer surface thereof for receiving a clip 147 for fixing the collar 130 to the tubular member 129 in abutment with the abutment surface 143. The biasing element 131 is located between the second abutment surface 127 on the attachment body 105 and the collar 130 to bias the tubular member 129 in a downward direction outwardly of the attachment body 105.

The auto-drain unit 101 further comprises a main housing 151 which is attached, in this embodiment clipped, to the upper end 115 of the attachment body 105.

The main housing 151 includes a first axially-extending annular flange 153 at one, the lower, surface 155 thereof, which flange 153 is attached, in this embodiment clipped, to the upper end of 115 of the attachment body 105. The flange 153 includes a plurality of apertures 157 for providing a fluid communication path to the upper end 133 of the tubular member 129.

The main housing 151 further includes an annular recess 291 at the periphery of the other, upper, surface 161 thereof for receiving an inner sleeve 203 as will be described in more detail hereinbelow.

The main housing 151 further includes a pivot support 167 for pivotally supporting a paddle unit 220 as will be described in more detail hereinbelow.

The main housing 151 further includes a valve block 293 which is at the upper surface 161 thereof and extends radially to the longitudinal axis thereof. The valve block 293 includes a recess 294 which is at one end thereof adjacent the pivot support 167, a valve seat 295 which is disposed in the base of the recess 294, and a piston bore 297, 25 one end of which is in fluid communication with the valve seat 295 and the other end of which is open at the other end of the valve block 293.

The main housing 151 further includes an annular groove 165 in the outer peripheral surface thereof, which groove 165 includes an annular seal 166 for providing a fluid tight seal with an outer sleeve 205 as will be described in more detail hereinbelow.

The main housing 151 further includes an axially-extending piston bore 173 which is axially aligned with the tubular member 129 of the cylinder assembly 128 and extends inwardly from the lower end of the first flange 153 on the lower surface 155 thereof.

The main housing 151 further includes a fluid conduit 299 which fluidly connects the inner end of the piston bore 173 to the valve seat 295.

The auto-drain unit 101 further comprises a piston unit 177 which is slideably disposed both in the tubular member 129 of the cylinder assembly 128 and the piston bore 173 in the main housing 151. The piston unit 177 and the annular seal 141 in the head section 138 of the tubular member 129 together provide a discharge valve which is actuatable to vent the filter bowl 107 to atmosphere or a suitable collection vessel and enable the discharge of collected liquid under the action of the system pressure.

The piston unit 177 includes a piston head 179 at one, the lower, end 181 thereof which has an outer diameter which is such as to provide a fluid-tight seal with the inner surface of the annular seal 141 in the head section 138 of the tubular member 129.

The piston unit 177 further includes a drive piston 183 at the other, upper, end 184 thereof which has an outer diameter which is substantially the same as the inner diameter of the piston bore 173 in the main housing 151 so as to be a close sliding fit therein. The drive piston 183 includes an annular groove 186 in the outer surface thereof, which groove 186 includes an annular seal 187 for providing a fluid-tight seal between the piston bore 173 and the drive piston 183.

The piston unit 177 further includes a piston stem 189 which has a smaller outer diameter than the piston head 179 and connects the piston head 179 to the drive piston 183. The outer diameter of the piston stem 189 is such as to provide an annular gap thereabout when located in the annular seal 141 in the head section 138 of the tubular member 129.

The piston unit 177 further includes a through bore 191 which serves as a bleed path to allow for the return of the piston unit 177 to the closed, non-actuated position as will be described in more detail hereinbelow. The bore 191 includes a first section 193 of a first, very small inner diameter at the lower end 181 thereof, which section 193 is dimensioned to provide a high resistance to fluid flow therethrough but yet provide a bleeding function. The bore 191 further includes a second, intermediate section 195 of a second inner diameter which is larger than the inner diameter of the first section 193. The bore 191 further includes a third section 197 at the upper end 184 thereof which has a larger diameter than the second section 195 and defines an abutment surface 199 at the junction therewith. The third section 197 includes a biasing element 201, in this embodiment a compression spring, which abuts the abutment surface 199 and the inner end of the piston bore 173 so as to bias the piston unit 177 outwardly. As will be described in more detail hereinbelow, the function of the biasing element 201 is to drive the piston unit 177 to the open, actuated position when there is no system pressure, thereby providing for the draining of the filter assembly 103 on system shutdown.

The auto-drain unit 101 further comprises first and second co-axial sleeves 203, 205, in this embodiment cylindrical sleeves, which are fixed to the periphery of the main housing 151 and define a fluid conduit 207 which acts as a snorkel and fluidly connects a reference chamber 319 at the upper surface 161 of the main housing 161, as will be described in more detail hereinbelow, to a location which is a predetermined height above the upper surface 161 of the main housing 151 and represents a height within the filter bowl 107 above the maximum permitted liquid level therein.

The inner sleeve 203 is sealingly fitted to the peripheral recess 291 in the upper surface 161 of the main housing 151. The inner sleeve 203 includes an inwardly-directed peripheral flange 209 which is adjacent one, the lower, end 211 thereof, an aperture 303 which is located between the lower end 211 thereof and the flange 209 and provides a fluid communication path to the fluid conduit 207 defined by the sleeves 203, 205, and a plurality of outwardly-extending bosses 213, each having a throughhole 215 therein, which are located at a position to the other side of the flange 209 and provide liquid transfer ports.

The outer sleeve 205 is a fluid-tight seal about the periphery of the main housing 151, being sealingly-engaged to the annular seal 166 in the outer surface thereof, and includes a plurality of apertures 217 in registration with the bosses 213 on the inner sleeve 203.

The auto-drain unit 101 further comprises a paddle assembly 219 which together with the valve seat 295 provides a trigger valve for actuating the discharge valve. As will become apparent hereinbelow, the trigger valve is pressure balanced in the sense that the axial and radial pressure forces are each balanced.

Figure 18:
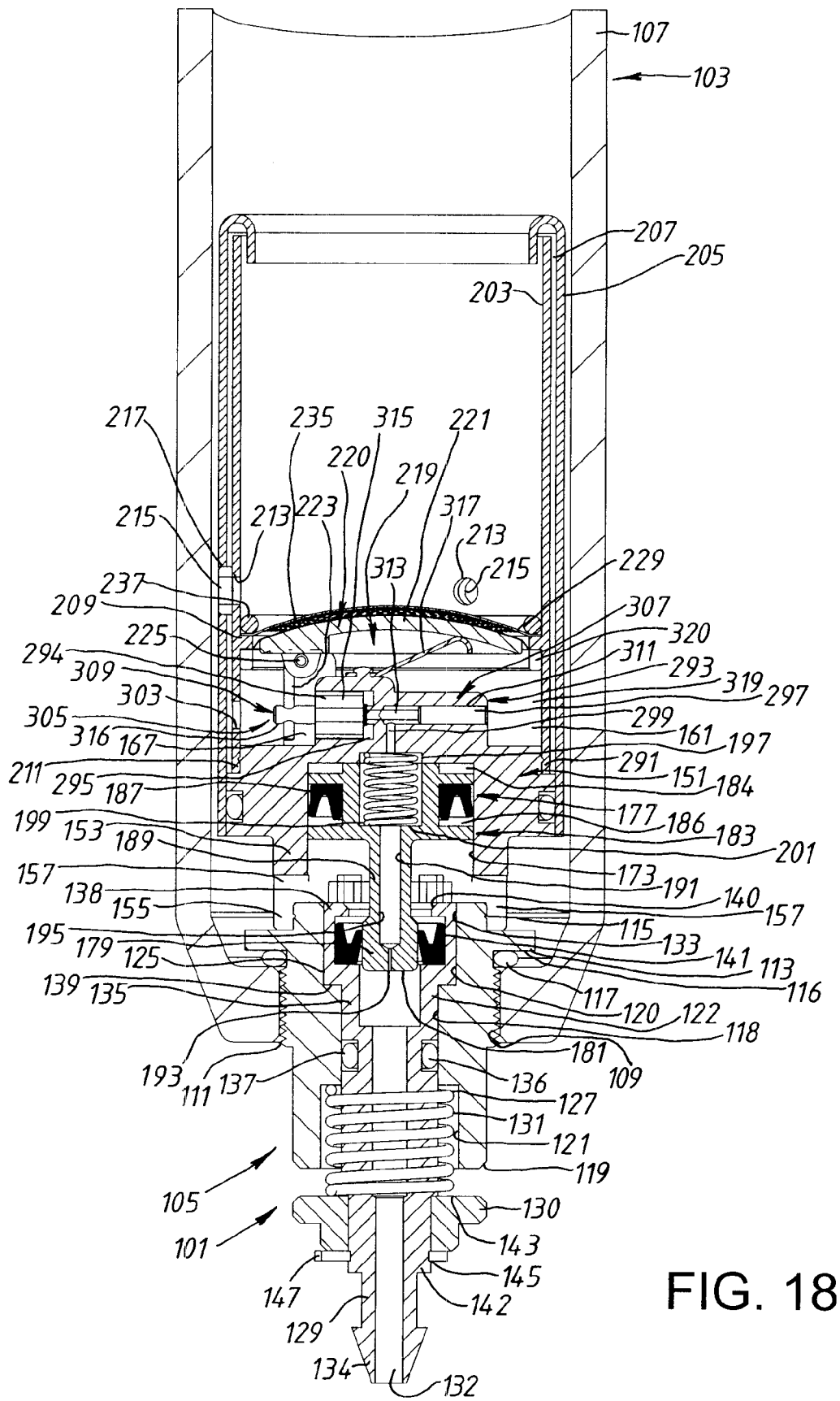
FIG. 18 illustrates a vertical sectional view of the auto-drain unit of FIG. 16, illustrated empty and with the trigger and discharge valves in the closed positions.
Figure 20:
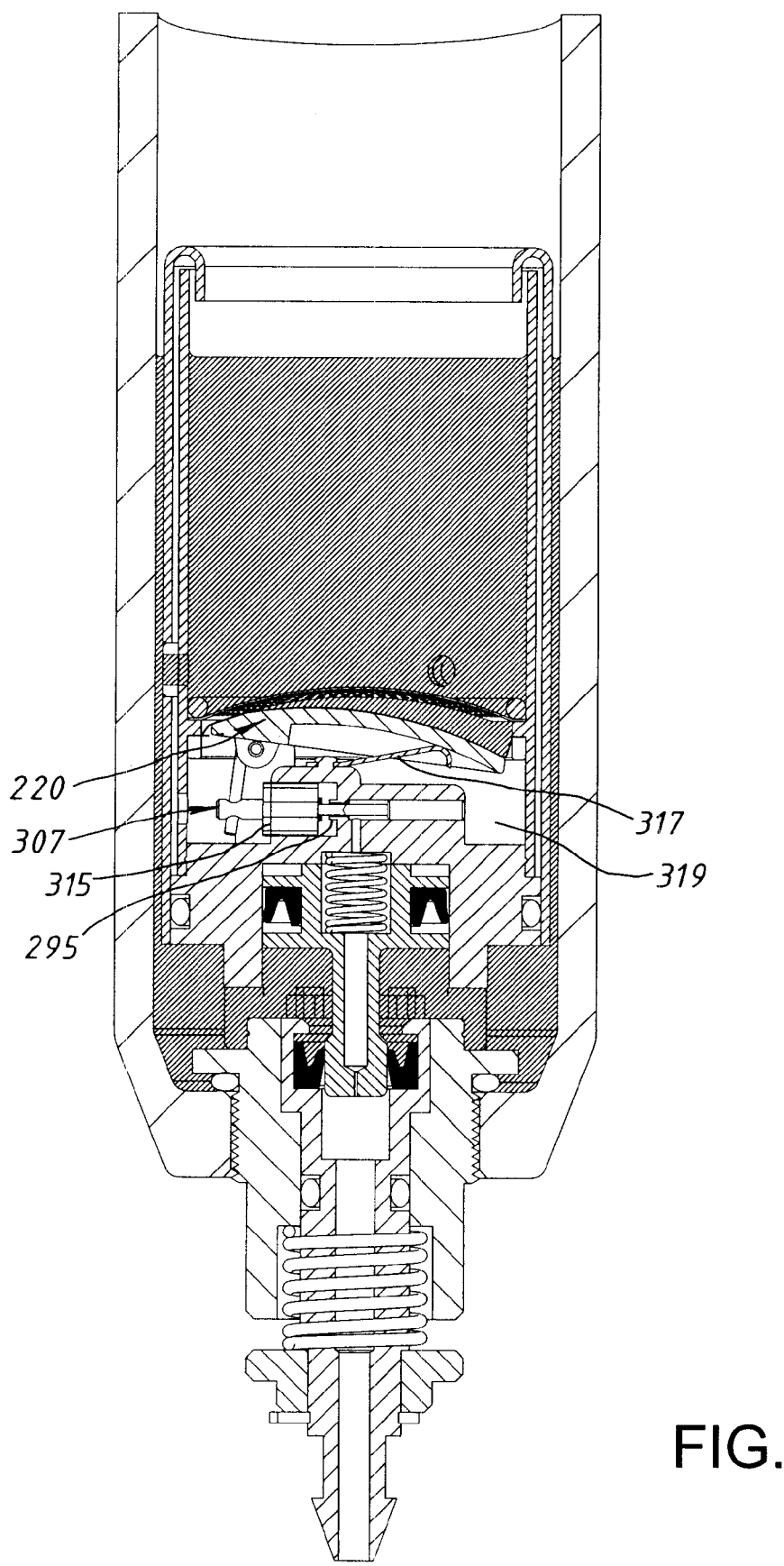
FIG. 20 illustrates a vertical sectional view of the auto-drain unit of FIG. 16, illustrated full and with the trigger valve in the open, actuated position and the discharge valve in the closed position.

The paddle assembly 219 comprises a paddle unit 220 which comprises a paddle member 221, in this embodiment a circular member having a part-spherical upper surface, which is located in the aperture defined by the flange 209 on the inner sleeve 203, and an arm member 223 which extends from the peripheral edge at the other, lower, surface of the paddle member 221. The arm member 223 includes a pivot pin 225 which is engaged to the pivot support 167 on the main housing 151 to allow for pivoting of the same between a first, non-actuated position (as illustrated in FIG. 18) and an actuated position (as illustrated in FIG. 20).

The paddle assembly 219 further comprises a sealing valve unit 305 which comprises a piston rod member 307, which is slideably disposed in the piston bore 297 in the valve block 293 and extends through the valve seat 295, and a valve pad member 309 which is coupled to the arm member 223 of the paddle unit 220.

The piston rod member 307 comprises a piston 311 which is slideably disposed in the piston bore 297 and a connecting rod 313 which is connected to the valve pad member 309.

The valve pad member 309 includes a valve pad 315, in this embodiment a soft polymer pad, which is configured to be located on the valve seat 295 when the paddle unit 220 is in the closed, non-actuated position, and thereby close the fluid conduit 299 to the system pressure, and be raised from the valve seat 295 to provide fluid communication between the fluid conduit 299 and the system pressure when the paddle unit 220 is in the open, actuated position.

The valve pad member 309 further includes a connecting arm 316 which is connected to the arm member 223 of the paddle unit 220.

The paddle assembly 219 further comprises a biasing element 317, in this embodiment a light leaf spring, which is fixed to the valve block 293 of the main housing 151 and acts on the paddle member 221 at a point opposite the arm member 223 to bias the paddle member 221 to the closed, non-actuated position.

The auto-drain unit 101 further comprises a diaphragm 229 which is sealingly attached to the flange 209 on the inner sleeve 203 and in part encloses a reference chamber 319 at the upper surface 161 of the main housing 151. In this embodiment the diaphragm 229 is retained by an annular element 320. The diaphragm 229 is a thin film which is sufficiently oversized as to be slack and floppy and provide for the direct force transfer of the weight of liquid collected thereabove to the paddle member 221 disposed therebelow. In this embodiment the diaphragm 229 is pre-formed so as to adopt an upwardly convex form when acted from below by the paddle member 221 (as illustrated in FIG. 18) and follow the contour of the paddle member 221 when moved to the actuated position (as illustrated in FIG. 20). Suitable materials for the diaphragm 229 include PEEBAX Polyamide/Polyether MX1205 SN 01 and B F GOODRICH Estane 58887+5% 58236, with typical thicknesses of 30 and 50 μm. Fluid communication to the reference chamber 319 is through only the aperture 303 in the inner sleeve 203. As described hereinabove, the aperture 303 is fluidly connected to the fluid conduit 207 which opens at a height above the maximum permitted level of liquid collectable in the filter bowl 107. With this configuration, the reference chamber 319 is at the system pressure and is separated from the collected liquid.

The auto-drain unit 101 further comprises a perforated plate 235 which is disposed above the diaphragm 229 on the flange 209 on the inner sleeve 203. The plate 235 includes a plurality of small apertures which act to prevent the diaphragm 229 from being exposed directly to large slugs of liquid as often developed on system start-up. The plate 235 is retained by an annular spring clip 237 which engages the inner surface of the inner sleeve 203.

The operation of the auto-drain unit 101 will now be described hereinbelow with reference to FIGS. 18 to 22 of the accompanying drawings.

In a first state, as illustrated in FIG. 18, the filter assembly 103 is at the system pressure and empty of liquid. In this state, the trigger and discharge valves are closed. The paddle unit 220 of the trigger valve is maintained in the closed position by the biasing element 317, which acts to bias the paddle unit 220 to the closed position when the system pressure is applied equally to the upper and lower surfaces of the diaphragm 229. The piston unit 177 of the discharge valve is maintained in the closed position by the application of the system pressure to the lower, forward surface of the drive piston 183.

Figure 19:
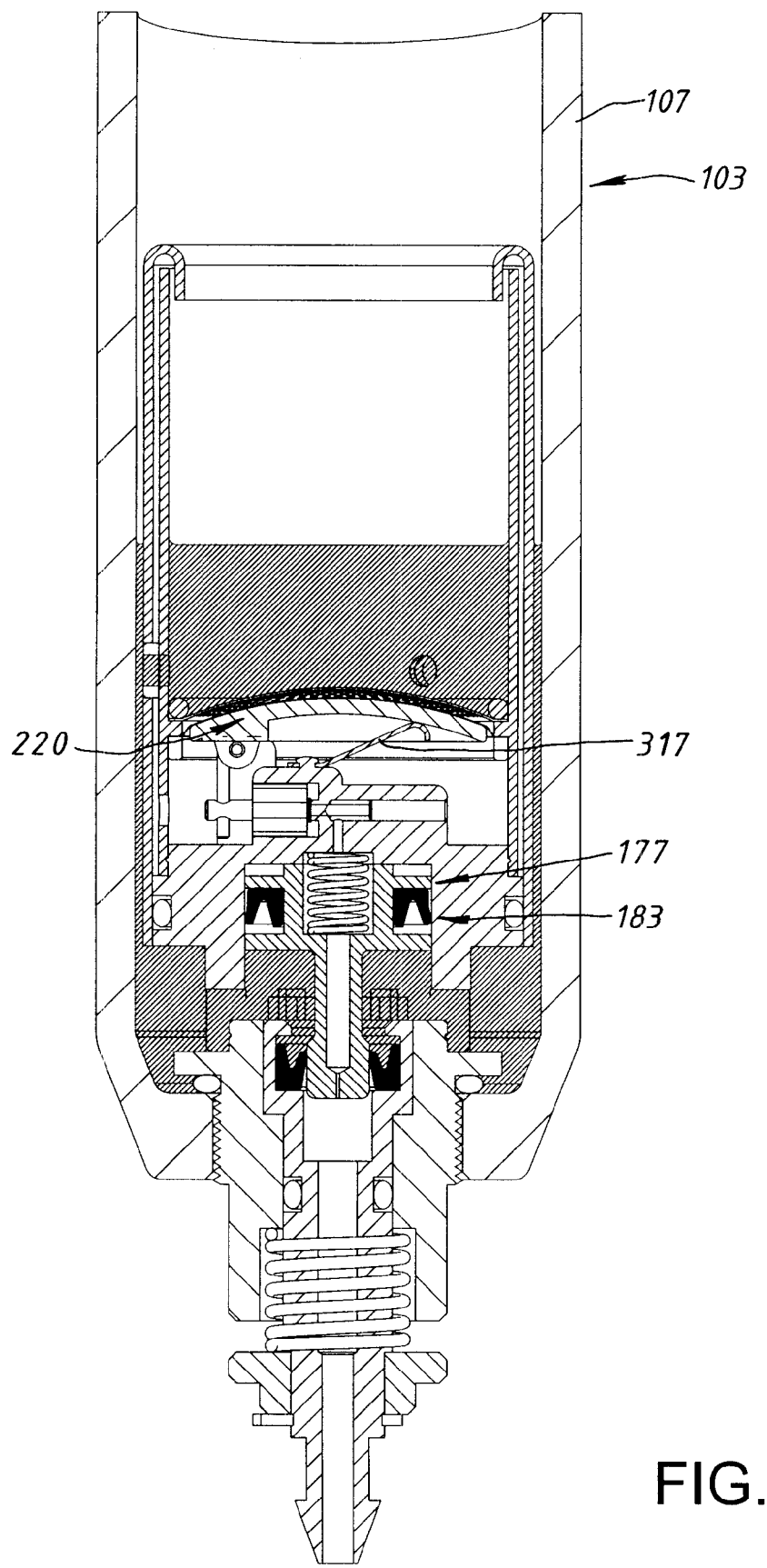
FIG. 19 illustrates a vertical sectional view of the auto-drain unit of FIG. 16, illustrated part-filled and with the trigger and discharge valves in the closed positions.

As illustrated in FIG. 19, the filter bowl 107 is in use progressively filled with liquid which is separated by the filter assembly 103 from the compressed gas stream. In a part-filled state, the trigger and discharge valves are closed. The paddle unit 220 of the trigger valve is loaded by the column of liquid thereabove, but the biasing force of the biasing element 317 is greater than the loading force of the column of liquid and the paddle unit 220 is maintained in the closed position. The piston unit 177 of the discharge valve is maintained in the closed position by the application of the system pressure to the lower, forward surface of the drive piston 183.

When the level of liquid reaches a predetermined threshold level, as illustrated in FIG. 20, the trigger valve is actuated by the pivoting of the paddle unit 220 which acts on the piston rod member 307 to raise the valve pad 315 thereof from the valve seat 295. The pivoting of the paddle unit 220 is caused by the load of the column of liquid thereabove exceeding the biasing force of the biasing element 317. When the trigger valve has just opened, there is a flow of gas from the reference chamber 319 to the piston bore 173 which causes the pressure in the reference chamber 319 to be reduced with respect to the main chamber. This momentary pressure reduction is rapidly compensated for by gas flow through the fluid conduit 207, but, for its duration, the effect is to apply an impulse to the diaphragm 229 to further bias the paddle unit 220 to the open position. This desirable positive feedback improves the valve opening action.

Figure 21:
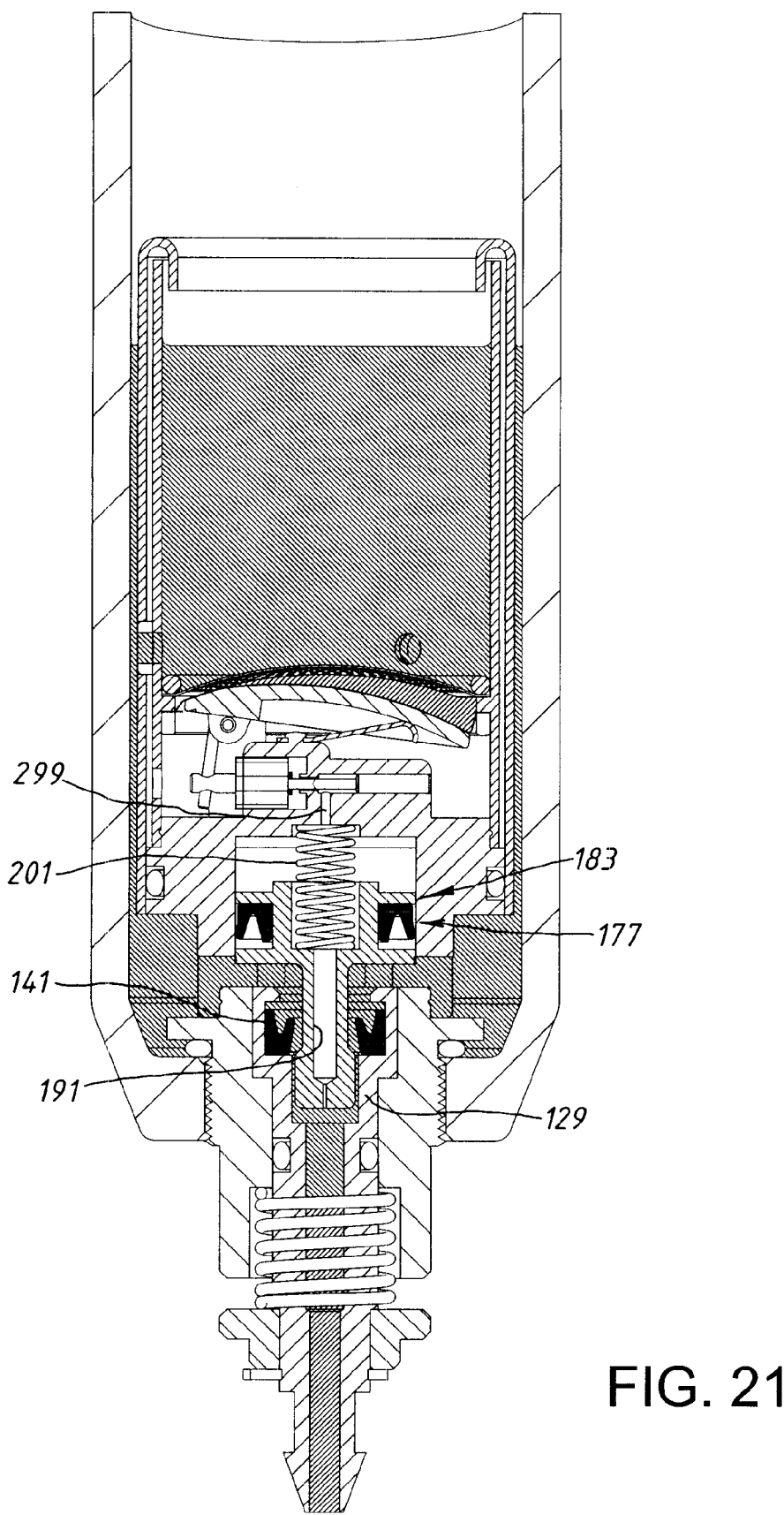
FIG. 21 illustrates a vertical sectional view of the auto-drain unit of FIG. 16, illustrated full and with the trigger and discharge valves in the open, actuated positions.

Almost instantaneously, as illustrated in FIG. 21, the piston unit 177 of the discharge valve is driven to the open position by the introduction of the system pressure to the fluid conduit 299 and the application of the system pressure on the upper, rear surface of the drive piston 183. In this embodiment the net force acting on the piston unit 177, achieved by the contributions of the force of the resilient element 201 and the force of the system pressure acting on the upper, rear surface of the drive piston 183 and the exposed surface of the piston head 179 as offset by the force of the system pressure acting on the lower, forward surface of the drive piston 183 and the loss through the bore 191 in the piston unit 177, is such as to drive the piston unit 177 to the open, actuated position and open the discharge valve. With the piston unit 177 in the open position, an annular gap is created between the piston unit 177 and the annular seal 141 in the tubular member 129 which allows for the explosive discharge of the collected liquid through the tubular member 129 to atmosphere or a suitable vessel.

Figure 22:
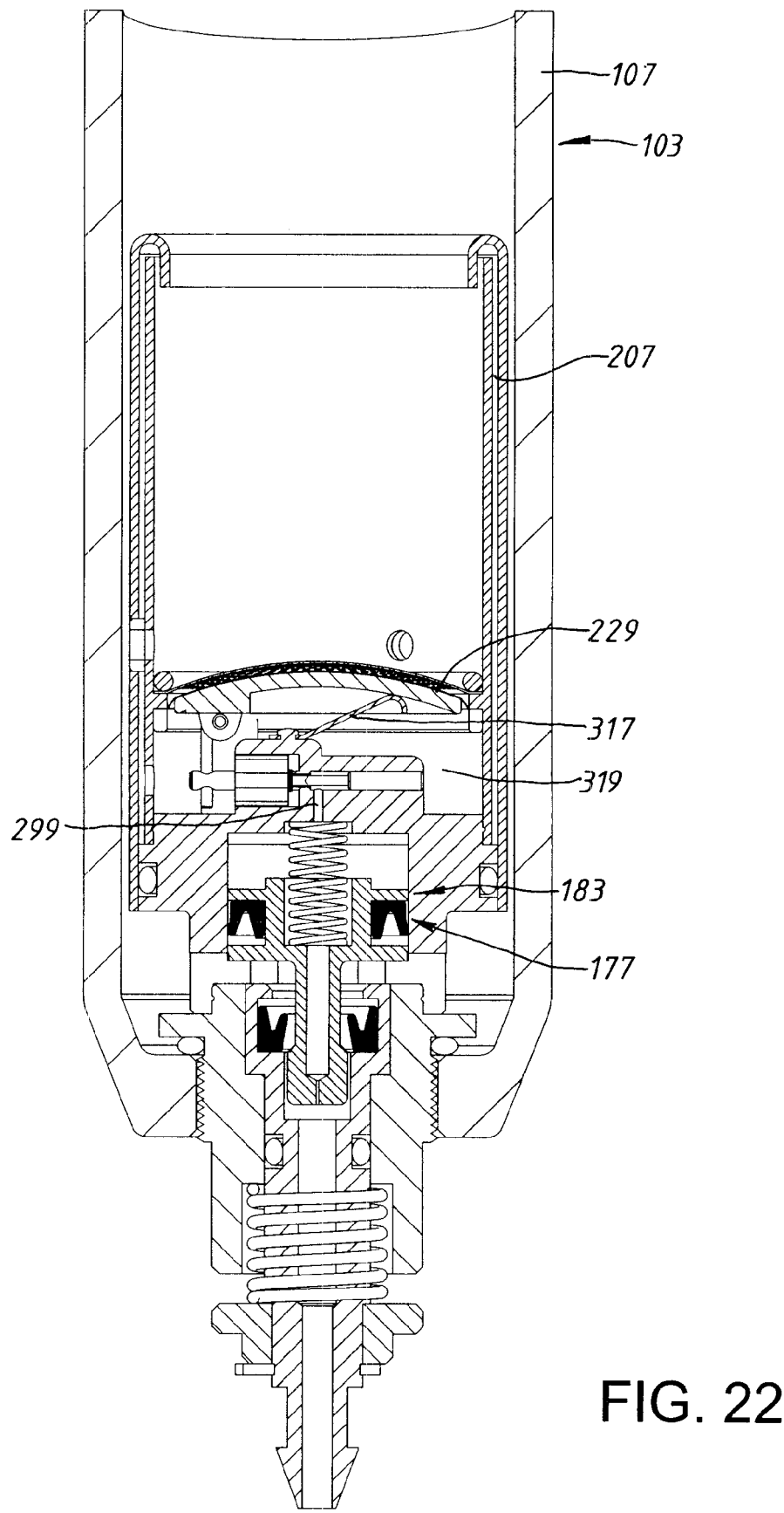
FIG. 22 illustrates a vertical sectional view of the auto-drain unit of FIG. 16, illustrated empty and with the trigger valve in the closed position and the discharge valve in the open, actuated position.

Referring to FIG. 22, immediately following the operation of the discharge valve, the pressure in the main chamber drops substantially due to the rapid flow of gas from the filter assembly 103. Although the pressures in the main chamber and the reference chamber 319 are equalized fairly rapidly, this pressure differential applies an impulse to the diaphragm 229 which is such as to return the diaphragm 229 to the raised position, allowing the paddle unit 220 to be returned to the closed position under the bias of the biasing element 317. In order to prevent damage to the diaphragm 229, the fluid conduit 207 should have a conductance which is sufficient to allow the reference chamber 319, which small compared to the main chamber, to equalize pressure rapidly.

As a result of the closure of the trigger valve, the system pressure is no longer applied to the fluid conduit 299 and hence the upper, rear surface of the drive piston 183, and the piston unit 177 returns to the closed position by the overriding action of the system pressure on the lower, forward surface of the drive piston 183. There is some delay in the return of the drive piston 183 to the closed position, and for this period of delay, collected liquid continues to be discharged. This delay is governed principally by the conductance of the compressed gas through the bore 191 in the piston unit 177 from the piston bore 173 at the upper, rear surface of the drive piston 183.

With the piston unit 177 in the closed position, the trigger and discharge valves are closed and the cycle is then repeated as further liquid is collected in the filter bowl 107.

Finally, it will be understood that the present invention has been described in its preferred embodiments and can be modified in many different ways without departing from the scope of the invention as defined by the appended claims.

In one modification, the above-described second embodiment can also be implemented in an uncompensated form, that is, a non-pressure balanced form, as a simple slide valve. While many equivalent geometries are conceivable, this modification could be achieved by eliminating the bobbin 283, enlarging the diameter of the pin 281 of the paddle unit 220 so as to be a close sliding fit in the bore of the valve sleeve 271, and providing a fluid conduit radially through the pin 281. Planar slide valves are also envisaged. In one embodiment the pin 281 could have a T-shaped sectional profile and be configured to open and close the third fluid conduit 277 on actuation of the paddle unit 220. As will be appreciated, uncompensated slide valves have to overcome frictional effects, for example, as induced between the pin 281 and the valve sleeve 271. At low loads, the coefficient of friction of many materials against a well prepared PTFE surface is approximately 0.1.

In another modification, the third-described embodiment can be implemented as a simple poppet valve without pressure balancing as in the above-described first embodiment, with suitable adaptation to achieve the necessary mechanical advantage, typically at least 4:1, about the pivot pin 225.

In all of the above-described embodiments, light springs have been used as biasing elements for compensating for the weight of the paddle unit 220. In the above-described first and third embodiments, the biasing can be achieved by the provision of an appropriate mass on the paddle unit 220 close to the valve pad to act as a counterweight.

In addition, gas pressure could be used to compensate for the weight of the paddle unit 220. For example, in the above-described second embodiment, the diameters of the two sealing lands of the valve bobbin 283 could be slightly different, and, in the above-described third embodiment the diameter of the pressure balancing piston 311 could be slightly greater than the valve orifice at the valve seat 295. This would generate out-of-balance forces which are directly proportional to the system pressure. For instance, at a system pressure of 1 barg, dimensions could be chosen to generate a net force of 1 g. The automatic opening of the trigger valve at zero system pressure owing to the weight of the paddle unit 220 is advantageous.

Also, in the second-described embodiment, a plurality of leaf springs disposed about the upper surface 161 of the main housing 151 could be used as the biasing element 287, each supporting the periphery of the paddle member 221. For example, four springs, each with a pre-compression force of 0.5 g, would result in a 2 g offset, ensuring that the weight of the paddle unit 220 is supported evenly around the periphery thereof. This would promote the linear movement of the paddle unit 220.

In the above-described embodiments, small permanent magnets could be used to pull the trigger valve shut at any system pressure. For example, a magnet could be embedded in the main housing 151 and a corrosion-protected ferromagnetic component bonded into the paddle unit 220. Using the force of attraction, an initial starting separation can be chosen which generates adequate force to compensate for the weight of the paddle unit 220, without excessive increase or reduction when the trigger valve is fully open.

In this document, pressures are discussed using the units of bar, where $1 \text{ bar} = 10^5 \text{ N/m}^2$. When referring to absolute pressure, that is, referenced to vacuum, the notation bara is used. When referring to relative pressure as referenced to atmospheric pressure, that is, gauge pressure, the notation barg is used. By way of example, a relative pressure of 7 barg is approximately equal to an absolute pressure of 8 bara, since atmospheric pressure varies around mean sea level pressure (1.013 bara) by only a few percent. Where convenient, the unit mbar is used, where 1 mbar=0.001 bar.

What is claimed is:

1. An auto-drain unit for a compressed gas supply system, comprising:
   a first, main chamber including a liquid collection reservoir;
   a second, reference chamber;
   a discharge valve actuatable to discharge collected liquid from the liquid collection reservoir;
   a trigger mechanism for actuating the discharge valve;
   a diaphragm at least in part defining the liquid collection reservoir and the reference chamber, the diaphragm being configured to be movable under the weight of liquid collected in the liquid collection reservoir and operate the trigger mechanism when the weight of collected liquid exceeds a predetermined threshold; and
   a fluid conduit fluidly connecting the reference chamber to a location in the main chamber above the maximum possible liquid level therein.

2. The auto-drain unit of claim 1, wherein the diaphragm is slack and able to move freely when loaded.

3. The auto-drain unit of claim 1, wherein the diaphragm has a thickness of not more than about 50 µm.

4. The auto-drain unit of claim 1, wherein the trigger mechanism comprises a trigger valve for actuating the discharge valve, the trigger valve being actuated when the weight of collected liquid exceeds a predeterminable threshold.

5. The auto-drain unit of claim 4, wherein the trigger valve includes a paddle unit which includes a paddle member disposed adjacent the diaphragm such as to be acted upon by the diaphragm when liquid collects in the liquid collection reservoir, the paddle unit being movable between a first, non-actuated position and a second, actuated position.

6. The auto-drain unit of claim 5, wherein the surface of the paddle member adjacent the diaphragm is a convex surface.

7. The auto-drain unit of claim 6, wherein the surface of the paddle member adjacent the diaphragm is a part-spherical surface.

8. The auto-drain unit of claim 5, wherein the trigger valve includes a biasing element for biasing the paddle unit to the first position.

9. The auto-drain unit of claim 5, wherein the paddle unit is pivotally supported such as to be pivoted when the weight of liquid acting on the paddle member exceeds a predetermined threshold.

10. The auto-drain unit of claim 9, wherein the paddle unit supports a valve pad for opening or closing a valve seat.

11. The auto-drain unit of claim 9, wherein the trigger valve further includes a sealing valve unit coupled to the paddle unit, the sealing valve unit including a piston and a valve pad mounted thereto for opening or closing a valve seat.

12. The auto-drain unit of claim 5, wherein the paddle unit is axially movable such as to be moved axially when the weight of liquid acting on the paddle member exceeds a predetermined threshold.

13. The auto-drain unit of claim 12, wherein the paddle unit includes a bobbin which is slideably disposed in a valve sleeve, the bobbin being movable in the valve sleeve between actuated and non-actuated positions.

14. The auto-drain unit of claim 4, wherein the trigger valve is pressure balanced.

15. The auto-drain unit of claim 1, wherein the fluid conduit comprises an annular conduit.

16. The auto-drain unit of claim 15, further comprising an annular element defining a cavity and including the fluid conduit at the periphery thereof.

17. The auto-drain unit of claim 16, wherein the annular element comprises first and second co-axial tubular sections of different lateral dimension, with the fluid conduit being defined therebetween.

18. The auto-drain unit of claim 16, wherein the diaphragm extends laterally across the cavity.

19. The auto-drain unit of claim 1, wherein the compressed gas supply system is a pneumatic supply system.

20. An apparatus, comprising a filter assembly including an auto-drain unit as in claim 1.

* * * * *